(12) United States Patent
Sano

(10) Patent No.: US 10,838,125 B2
(45) Date of Patent: Nov. 17, 2020

(54) INTERFERENCE FILTER, OPTICAL FILTER DEVICE, OPTICAL MODULE, AND ELECTRONIC APPARATUS

(71) Applicant: Seiko Epson Corporation, Tokyo (JP)

(72) Inventor: Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 16 days.

(21) Appl. No.: 15/883,376

(22) Filed: Jan. 30, 2018

(65) Prior Publication Data

US 2018/0172886 A1    Jun. 21, 2018

Related U.S. Application Data

(62) Division of application No. 14/215,510, filed on Mar. 17, 2014, now abandoned.

(30) Foreign Application Priority Data

Mar. 18, 2013    (JP) ................................. 2013-054678

(51) Int. Cl.
| | | |
|---|---|---|
| *G02B 5/28* | (2006.01) | |
| *G01J 3/51* | (2006.01) | |
| *G01J 3/26* | (2006.01) | |
| *G02B 26/00* | (2006.01) | |
| *G02B 26/08* | (2006.01) | |
| *G02B 6/293* | (2006.01) | |

(52) U.S. Cl.
CPC .................. *G02B 5/28* (2013.01); *G01J 3/26* (2013.01); *G01J 3/51* (2013.01); *G02B 26/001* (2013.01); *G02B 26/0841* (2013.01); *G02B 6/29358* (2013.01)

(58) Field of Classification Search
CPC ..... G02B 5/28; G02B 26/001; G02B 26/0841; G02B 26/29358; G01J 3/26; G01J 3/51
USPC ......................................................... 359/584
See application file for complete search history.

(56) References Cited

U.S. PATENT DOCUMENTS

| | | |
|---|---|---|
| 4,549,081 A | 10/1985 | Ace |
| 6,034,813 A | 3/2000 | Woodard et al. |
| 2006/0068226 A1 | 3/2006 | Kunii |
| (Continued) | | |

FOREIGN PATENT DOCUMENTS

| | | |
|---|---|---|
| JP | 01-094312 | 4/1989 |
| JP | 2003-057571 A | 2/2003 |
| (Continued) | | |

OTHER PUBLICATIONS

Extended European Search Report for Application No. EP 14 15 9859 dated May 9, 2014 (7 pages).

*Primary Examiner* — Thomas K Pham
*Assistant Examiner* — Mitchell T Oestreich
(74) *Attorney, Agent, or Firm* — Harness, Dickey & Pierce, P.L.C.

(57) ABSTRACT

A wavelength tunable interference filter includes a fixed substrate, a fixed reflection film that is provided on the fixed substrate, reflects part of incident light, and transmits at least part of the incident light, a movable reflection film that faces the fixed reflection film, reflects part of incident light, and transmits at least part of the incident light, and a fixed electrode that surrounds the fixed reflection film and has a light absorbing layer and a metal layer, and the light absorbing layer is disposed closer to the fixed substrate than the metal layer.

20 Claims, 14 Drawing Sheets

(56) References Cited

U.S. PATENT DOCUMENTS

| | | |
|---|---|---|
| 2006/0077516 A1 | 4/2006 | Kothari |
| 2007/0171531 A1 | 7/2007 | Nakamura |
| 2009/0109537 A1* | 4/2009 | Bright .................... G02B 5/287 359/588 |
| 2011/0019202 A1 | 1/2011 | Iwaki et al. |
| 2011/0222159 A1* | 9/2011 | Yamazaki ................ G01J 3/46 359/589 |
| 2012/0050751 A1* | 3/2012 | Blomberg ............. B81B 3/0013 356/519 |
| 2012/0127482 A1 | 5/2012 | Tanemura et al. |
| 2012/0188646 A1 | 7/2012 | Sano et al. |
| 2012/0194821 A1 | 8/2012 | Nozawa |
| 2012/0235269 A1 | 9/2012 | Uematsu et al. |
| 2012/0257280 A1 | 10/2012 | Sano et al. |

FOREIGN PATENT DOCUMENTS

| | | |
|---|---|---|
| JP | 2006-099108 A | 4/2006 |
| JP | 2006-234908 A | 9/2006 |
| JP | 2009-210312 A | 9/2009 |
| JP | 2012-047858 A | 3/2012 |
| JP | 2012-112777 A | 6/2012 |
| JP | 2012-155023 A | 8/2012 |
| JP | 2012-194055 A | 10/2012 |
| JP | 2012-220765 A | 11/2012 |
| JP | 2014-010272 A | 1/2014 |
| WO | WO-2012-138577 A1 | 10/2012 |

\* cited by examiner

INTERFERENCE FILTER, OPTICAL FILTER DEVICE, OPTICAL MODULE, AND ELECTRONIC APPARATUS

CROSS-REFERENCE TO RELATED APPLICATIONS

This application is a divisional of U.S. patent application Ser. No. 14/215,510 filed on Mar. 17, 2014, which claims priority to Japanese Patent Application No. 2013-054678 filed Mar. 18, 2013, the disclosures of which are hereby expressly incorporated by reference herein in their entireties.

BACKGROUND

1. Technical Field

The present invention relates to an interference filter, an optical filter device, an optical module, and an electronic apparatus.

2. Related Art

A known wavelength tunable interference filter has a pair of reflection films facing each other and changes a distance between the reflection films is changed to extract light of a predetermined wavelength from light under measurement (see JP-A-2003-57571, for example). The pair of reflection films disposed in the wavelength tunable interference filter face each other and cause incident light to undergo an interference process to transmit light of a given wavelength according to the dimension of the gap between the reflection films.

In the thus configured wavelength tunable interference filter, when light that does not pass through the area where the pair of reflection films are disposed so that they face each other, that is, light that is not separated by the wavelength tunable interference filter exits out thereof and is received with a light receiver, spectroscopic precision decreases.

To reduce the decrease in spectroscopic precision, in JP-A-2003-57571, a metal electrode provided to change the dimension of the gap between the reflection films is used as an aperture.

In JP-A-2003-57571, however, the metal electrode used as an aperture is made of a metal material having a relatively high reflectance (aluminum, gold, chromium, or titanium, for example). When used as an aperture, the thus formed metal electrode may undesirably reflect light incident thereon to produce reflected light. The reflected light may then undesirably be reflected off an enclosure that seals the wavelength tunable interference filter or the inner wall and other portions of an optical module or any other apparatus that accommodates the wavelength tunable interference filter to form stray light. The stray light is then received by a light receiver, undesirably resulting in a decrease in spectroscopic precision.

SUMMARY

An advantage of some aspects of the invention is to provide an interference filter, an optical filter device, an optical module, and an electronic apparatus capable of suppressing the generation of stray light.

An aspect of the invention is directed to an interference filter including a substrate, a first reflection film that is provided on the substrate, reflects part of incident light, and transmits at least part of the incident light, a second reflection film that faces the first reflection film, reflects part of incident light, and transmits at least part of the incident light, and a first electrode that is provided in an area around the first reflection film and has a light absorbing layer and a metal layer, and the light absorbing layer is disposed in a position closer to the substrate than the metal layer.

In the aspect of the invention, the first electrode is disposed in an area around the first reflection film. In the first electrode, the light absorbing layer is disposed on the side facing the substrate, and the metal layer is disposed on the opposite side of the light absorbing layer to the substrate.

The thus configured first electrode functions as an aperture because the inner circumferential edge of the first electrode defines a light incident range through which light is incident on the first reflection film. Defining the light incident range through which light is incident on the first reflection film as described above prevents light from being incident on areas other than the area where the reflection films face each other, whereby a decrease in spectroscopic precision can be reduced.

Further, in the first electrode, since light that passes through the substrate and enters the light absorbing layer of the first electrode is absorbed by the light absorbing layer, the amount of light reflected off the metal layer and directed toward the substrate again can be reduced. As a result, stray light generated by reflection at the metal layer of the first electrode can be suppressed, whereby a decrease in spectroscopic precision can be reduced.

In the interference filter according to the aspect of the invention, it is preferable that at least part of an inner circumferential edge of the first electrode is in contact with the first reflection film.

With this configuration, at least part of an inner circumferential edge of the first electrode is in contact with the first reflection film. As a result, the first electrode and the first reflection film partially overlap with each other, whereby no gap is created between the first reflection film and the first electrode, and hence light passing through a possible gap is not present.

In the interference filter according to the aspect of the invention, it is preferable that the first electrode has a frame-like shape that surrounds the first reflection film.

With this configuration, the first electrode has a frame-like shape that surrounds the first reflection film and the first electrode is disposed so that it surrounds the first reflection film. The configuration allows the first electrode as an aperture to have improved light blocking performance, whereby a decrease in spectroscopic precision can be further effectively reduced.

In the interference filter according to the aspect of the invention, it is preferable that the interference filter further includes a movable portion on which the second reflection film is disposed and which is capable of moving in a thickness direction of the second reflection film, and the shortest distance between outer circumferential edges of the first reflection film and the first electrode is greater than the shortest distance between outer circumferential edges of the first reflection film and the movable portion when the interference filter is viewed in the thickness direction.

With this configuration, when the interference filter is viewed in the thickness direction of the second reflection film (that is, in a plan view viewed in the thickness direction of the substrate), the shortest distance between the outer circumferential edges of the first reflection film and the first electrode is greater than the shortest distance between the outer circumferential edges of the first reflection film and the movable portion. In other words, the first electrode is disposed so that it is present on both the inner and outer sides of the outer circumferential edge of the movable portion, and the outer circumferential edge of the first electrode is located in a position outside the outer circumferential edge of the movable portion. As a result, no light will be incident on the outer circumferential edge of the movable portion, whereby stray light can be suppressed.

In the interference filter according to the aspect of the invention, it is preferable that the interference filter further includes an stress relaxation film provided on a surface of the substrate that faces away from the surface on which the first electrode is provided with the stress relaxation film facing the first electrode through the substrate, and the stress relaxation film has two light absorbing layers and a metal layer provided between the two light absorbing layers.

With this configuration, a stress relaxation film is provided on a surface of the substrate that faces away from the surface on which the first electrode is provided with the stress relaxation film facing the first electrode through the substrate, and the stress relaxation film has two light absorbing layers and a metal layer provided between the light absorbing layers.

Since the stress relaxation film has the same metal layer as that of the first electrode, the stress relaxation film produces internal stress having substantially the same magnitude of internal stress produced in the metal layer of the first electrode, whereby the overall internal stress that acts on the substrate can be canceled and hence deformation of the substrate can be prevented.

Further, the stress relaxation film has a pair of light absorbing layers that sandwich the metal film. The light absorbing layer facing the substrate can absorb light incident through the substrate, and even when part of light incident on the interference filter is incident on the stress relaxation film, the other light absorbing layer can absorb the incident light.

As described above, the stress relaxation film of the aspect of the invention can not only reduce the stress produced by the first electrode but also reliably suppress stray light.

In the interference filter according to the aspect of the invention, it is preferable that the first reflection film is electrically conductive, and that the first electrode is electrically connected to the first reflection film.

With this configuration, since the first reflection film and the first electrode are electrically connected to each other, the first reflection film can be used as an electrode via the first electrode. Further, setting the first electrode at, for example, a ground potential allows removal of charge accumulated on the first reflection film.

In the interference filter according to the aspect of the invention, it is preferable that the second reflection film is electrically conductive, and that the interference filter further includes a mirror electrode connected to the second reflection film.

With this configuration, since the second reflection film is connected to the mirror electrode, the second reflection film is allowed to function as an electrode. In this case, for example, setting the first electrode and the mirror electrode at the same potential (ground potential, for example) prevents generation of electrostatic attractive force between the first reflection film and the second reflection film. Further, the first reflection film and the second reflection film are allowed to function as electrodes for capacitance detection. Moreover, a drive voltage can be applied between the first reflection film and the second reflection film. In this case, the first reflection film and the second reflection film are also allowed to function as drive electrodes for changing the dimension of the gap between the first reflection film and the second reflection film.

In the interference filter according to the aspect of the invention, it is preferable that the interference filter further includes a second electrode provided on the movable portion and facing at least part of the first electrode.

With this configuration, the first electrode and the second electrode can form a gap changer that changes the dimension of the gap between the reflection films. It is therefore unnecessary to separately provide a drive electrode and the first electrode as an aperture, whereby the size of the interference filter can be reduced.

In the interference filter according to the aspect of the invention, it is preferable that the second electrode is formed of a plurality of partial electrodes electrically independent of each other, and that the first electrode is an electrode common to the plurality of partial electrodes.

With this configuration, using the first electrode as an electrode common to the partial electrodes and setting the partial electrodes at different potentials allow electrostatic attractive forces having different magnitudes to be produced between the partial electrodes and the first electrode. That is, the plurality of partial electrodes and the first electrode that faces them can form a plurality of electrostatic actuators, whereby the dimension of the gap between the reflection films can be controlled with high precision.

In the interference filter according to the aspect of the invention, it is preferable that the substrate is made of a glass material, that the light absorbing layer is made of at least one of TiW, TiN, NiCr, $TiO_2$, $Al_2O_3$, $MgF_2$, $Nd_2O_3$, and $Ta_2O_5$ and formed on the substrate, and that the metal layer is formed on the light absorbing layer.

With this configuration, the substrate is made of a glass material. The light absorbing layer is made of at least one of TiW, TiN, NiCr, $TiO_2$, $Al_2O_3$, $MgF_2$, $Nd_2O_3$, and $Ta_2O_5$ and formed on the substrate. The metal layer is formed on the light absorbing layer. The thus formed light absorbing layer is in intimate contact with the metal layer and the substrate, which is made of a glass material, whereby the metal layer and the substrate can be reliably connected to each other. Further, the light absorbing layer can suppress reflection at the interface between the light absorbing layer and the substrate, which is made of a glass material, whereby generation of stray light can be more effectively suppressed.

In the interference filter according to the aspect of the invention, it is preferable that the metal layer is made of at least one of Au, Al, Ti, Ag, W, Nb, Ta, Mo, Cu, Ni, Co, Fe, Pt, and Zn.

With this configuration, the metal layer is made of at least one of Au, Al, Ti, Ag, W, Nb, Ta, Mo, Cu, Ni, Co, Fe, Pt, and Zn.

The metal layer can therefore be formed by using a highly electrically-conductive, light-blocking material, whereby the metal layer can be preferably used both as an electrode and an aperture.

Another aspect of the invention is directed to an interference filter including a first reflection film that reflects part of incident light and transmits at least part of the incident light, a second reflection film that faces the first reflection film, reflects part of incident light, and transmits at least part of the incident light, and a first electrode that is provided in an area around the first reflection film and has a light absorbing layer and a metal layer, and the light absorbing layer is disposed in a position farther away from the second reflection film than the metal layer in a direction from the first reflection film toward the second reflection film.

In the aspect of the invention, the first electrode is disposed in an area around the first reflection film and functions as an aperture, as in the aspect of the invention described above. Further the first electrode has the light absorbing layer. The amount of light reflected off the metal layer can therefore be reduced. As a result, stray light generated by reflection at the metal layer of the first electrode can be suppressed, whereby a decrease in spectroscopic precision can be reduced.

Still another aspect of the invention is directed to an optical filter device including an interference filter including a substrate, a first reflection film that is provided on the substrate, reflects part of incident light, and transmits at least part of the incident light, a second reflection film that faces the first reflection film, reflects part of incident light, and transmits at least part of the incident light, and a first electrode that is provided in an area around the first reflection film and has a light absorbing layer and a metal layer; and an enclosure that accommodates the interference filter, and the light absorbing layer is disposed in a position closer to the substrate than the metal layer.

In the aspect of the invention, the first electrode is disposed in an area around the first reflection film and functions as an aperture, as in the aspect of the invention described above. Further, the first electrode has the light absorbing layer. Therefore, in the area where the first electrode is formed, light having passed through the substrate can be blocked, and stray light generated by reflection at the metal layer of the first electrode can be suppressed, whereby a decrease in spectroscopic precision can be reduced.

Further, since the interference filter is accommodated in the enclosure, degradation of the reflection films due to gases and other substances contained in the atmosphere and adherence of foreign matter to the reflection films can be prevented.

Yet another aspect of the invention is directed to an optical module including a substrate, a first reflection film that is provided on the substrate, reflects part of incident light, and transmits at least part of the incident light, a second reflection film that faces the first reflection film, reflects part of incident light, and transmits at least part of the incident light, a first electrode that is provided in an area around the first reflection film and has a light absorbing layer and a metal layer; and a detector that detects light extracted by the first reflection film and the second reflection film, and the light absorbing layer is disposed in a position closer to the substrate than the metal layer.

In the aspect of the invention, the first electrode is disposed in an area around the first reflection film and functions as an aperture, as in the aspect of the invention described above. Further, the first electrode has the light absorbing layer. The optical module therefore allows, in the area where the first electrode is formed, light having passed through the substrate to be blocked and stray light generated by reflection at the metal layer of the first electrode to be suppressed, whereby a decrease in spectroscopic precision can be reduced.

Still yet another aspect of the invention is directed to an electronic apparatus including a substrate, a first reflection film that is provided on the substrate, reflects part of incident light, and transmits at least part of the incident light, a second reflection film that faces the first reflection film, reflects part of incident light, and transmits at least part of the incident light, a first electrode that is provided in an area around the first reflection film and has a light absorbing layer and a metal layer; and a control unit that controls the interference filter, and the light absorbing layer is disposed in a position closer to the substrate than the metal layer.

In the aspect of the invention, the first electrode is disposed in an area around the first reflection film and functions as an aperture, as in the aspect of the invention described above. Further, the first electrode has the light absorbing layer. The electronic apparatus therefore allows, in the area where the first electrode is formed, light having passed through the substrate to be blocked and stray light generated by reflection at the metal layer of the first electrode to be suppressed, whereby a decrease in spectroscopic precision can be reduced.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

A first embodiment will be described below with reference to the drawings.

Configuration of Spectroscopic Measurement Apparatus

Figure 1:
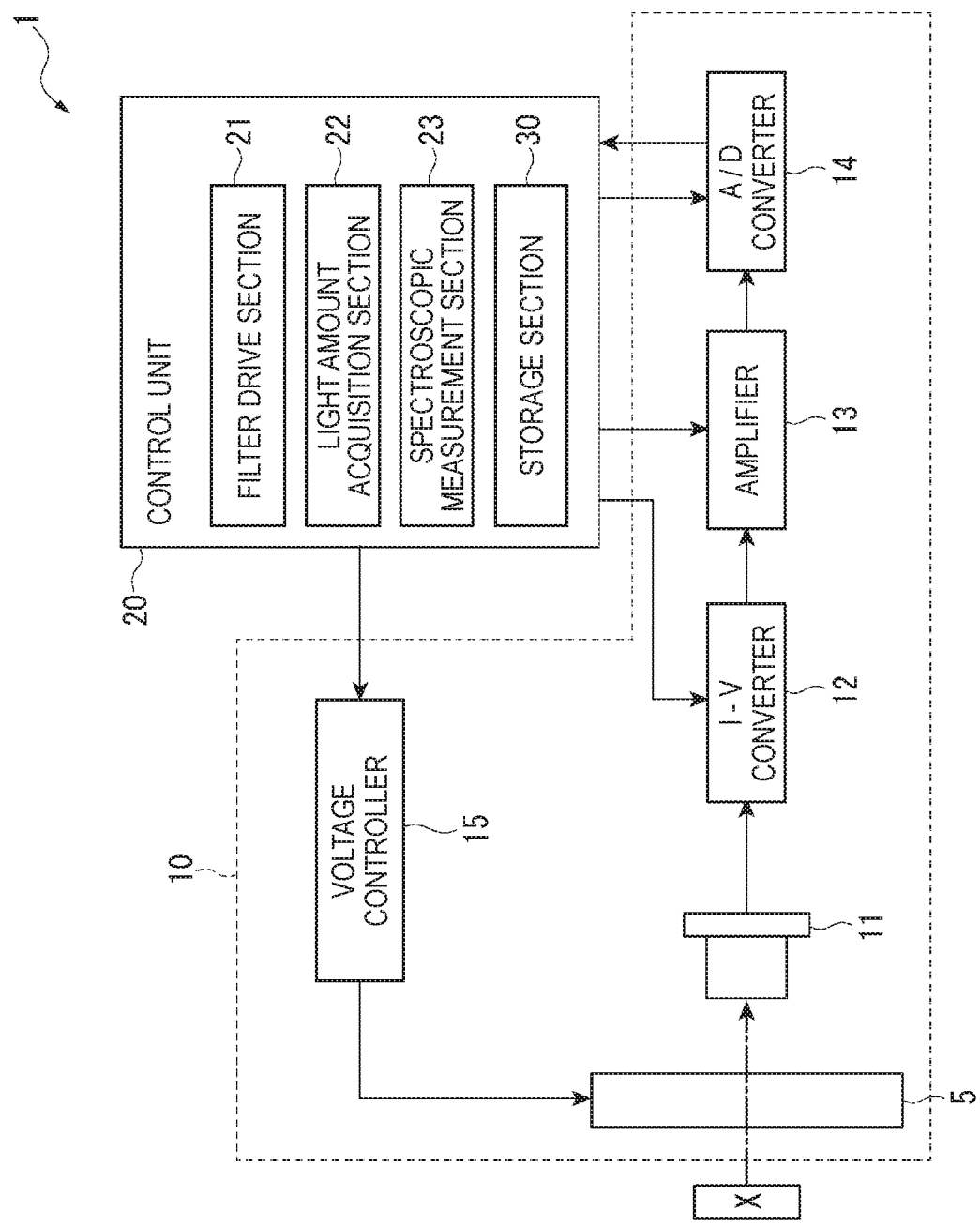
FIG. 1 is a block diagram showing a schematic configuration of a spectroscopic measurement apparatus of a first embodiment.

FIG. 1 is a block diagram showing a schematic configuration of a spectroscopic measurement apparatus of a first embodiment according to the invention.

A spectroscopic measurement apparatus 1 is an electronic apparatus of an embodiment according to the invention and an apparatus that receives light under measurement reflected off an object X under measurement and measures the spectrum of the light under measurement. In the present embodiment, the light under measurement reflected off the object X under measurement is measured by way of example, whereas when the object X under measurement is a light emitting object, such as a liquid crystal panel, light emitted from the light emitting object may be the light under measurement.

The spectroscopic measurement apparatus 1 includes an optical module 10 and a control unit 20, as shown in FIG. 1.

Configuration of Optical Module

The optical module 10 includes a wavelength tunable interference filter 5, a detector 11, an I-V converter 12, an amplifier 13, an A/D converter 14, and a voltage controller 15.

In the optical module 10, light under measurement is guided via an optical system for incident light (not shown) to the wavelength tunable interference filter 5, which transmits light of a predetermined wavelength out of the light under measurement, and the detector 11 receives the transmitted light. A detection signal from the detector 11 is outputted via the I-V converter 12, the amplifier 13, and the A/D converter 14 to the control unit 20.

Configuration of Wavelength Tunable Interference Filter

Figure 2:
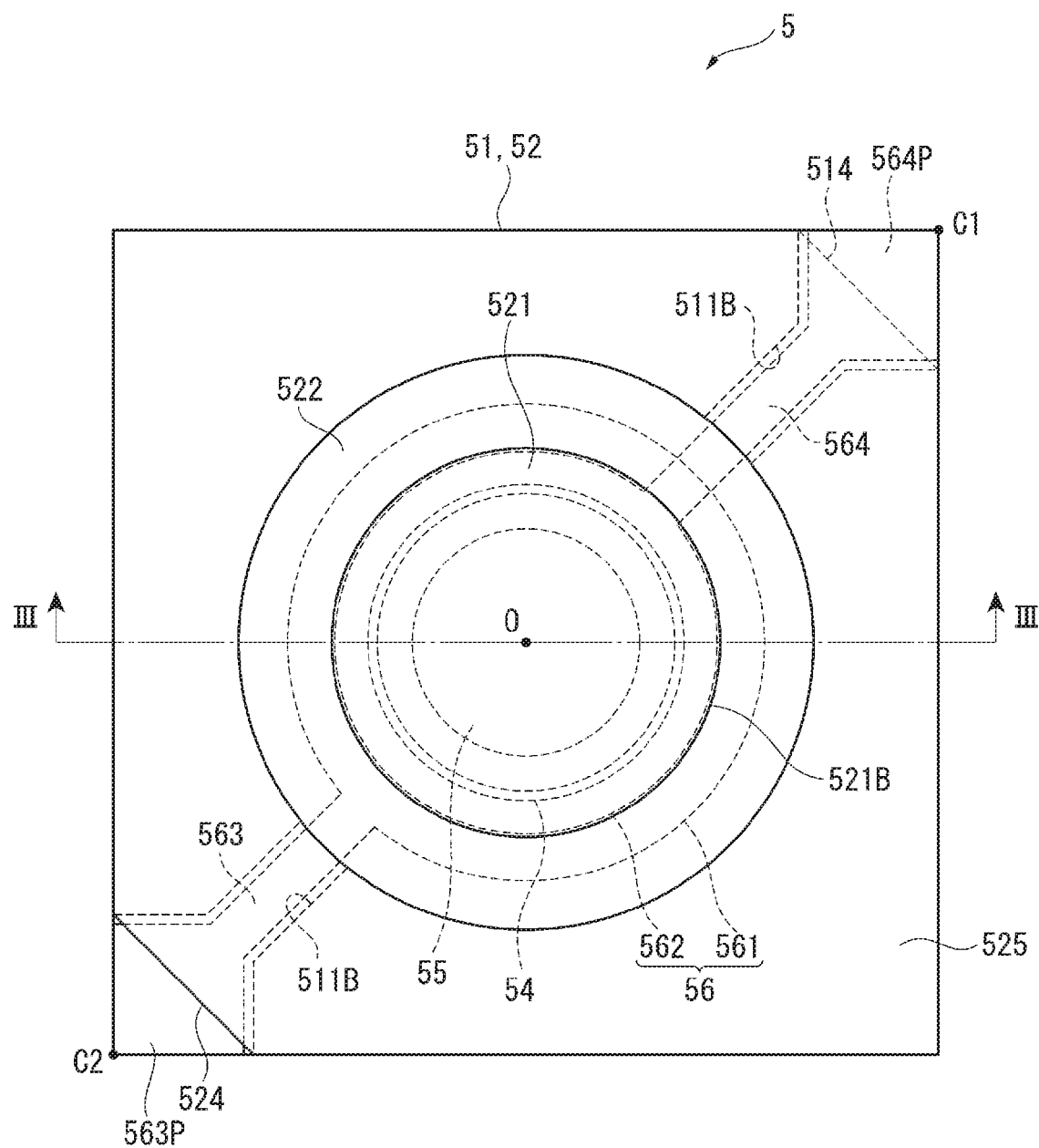
FIG. 2 is a plan view showing a schematic configuration of a wavelength tunable interference filter of the first embodiment.
Figure 3:
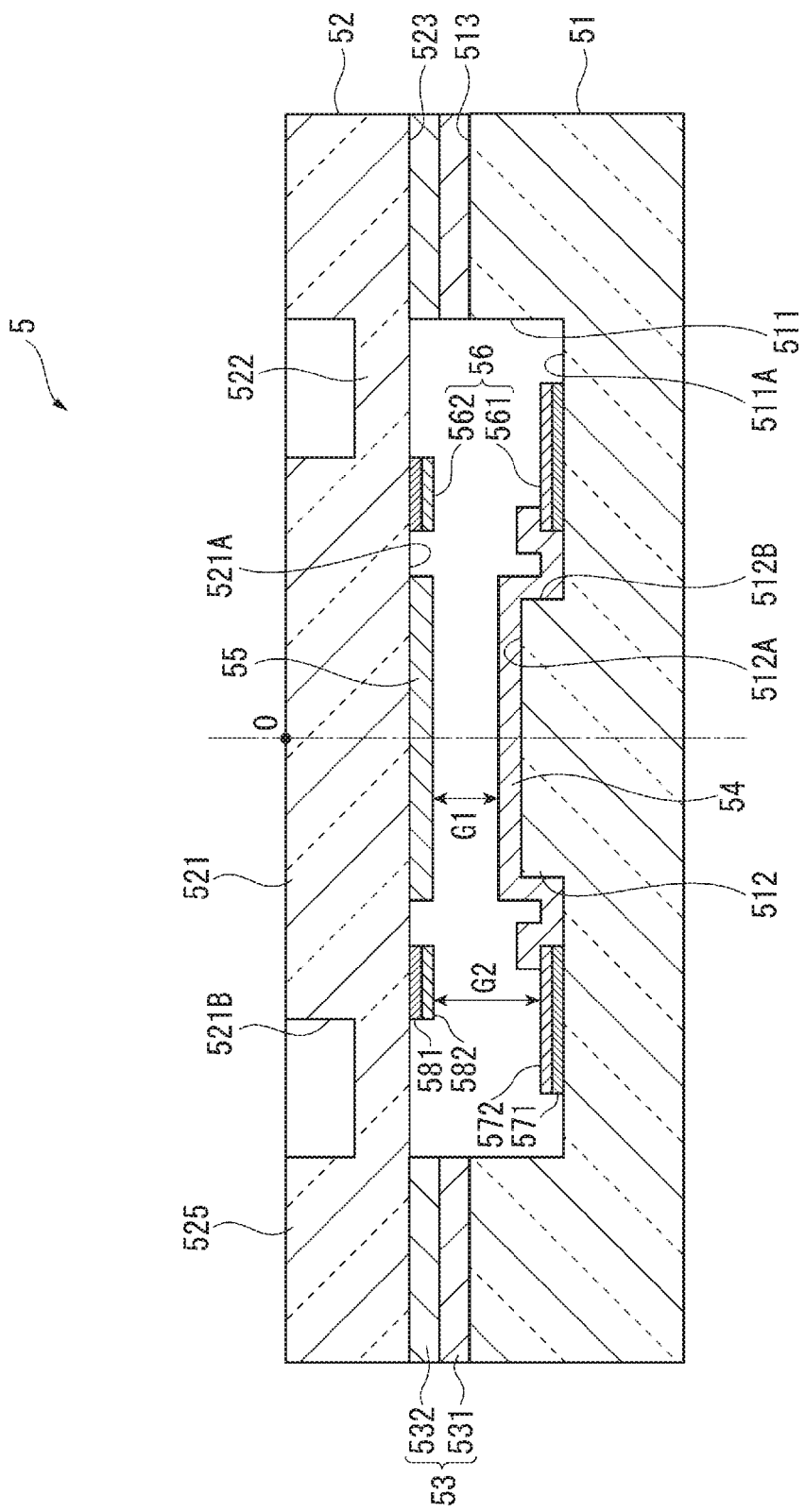
FIG. 3 is a cross-sectional view of the wavelength tunable interference filter taken along the line III-III in FIG. 2.

The wavelength tunable interference filter 5 incorporated in the spectroscopic measurement apparatus 1 will now be described below. FIG. 2 is a plan view showing a schematic configuration of the wavelength tunable interference filter. FIG. 3 is a cross-sectional view of the wavelength tunable interference filter taken along the line III-III in FIG. 2.

The wavelength tunable interference filter 5 of the present embodiment is what is called a Fabry-Perot etalon. The wavelength tunable interference filter 5 includes a fixed substrate 51, which correspond to the substrate in an embodiment according to the invention, and a movable substrate 52, as shown in FIGS. 2 and 3. Each of the fixed substrate 51 and the movable substrate 52 is made, for example, of any of a variety of glass materials, quartz, or silicon. A first bonding portion 513 of the fixed substrate 51 and a second bonding portion 523 of the movable substrate 52 are bonded to each other via a bonding film 53 formed, for example, of a plasma polymerization film primarily made, for example, of siloxane so that the fixed substrate 51 and the movable substrate 52 form an integrated unit.

A fixed reflection film 54 (first reflection film) is provided on the fixed substrate 51, and a movable reflection film 55 (second reflection film) is provided on the movable substrate 52. The fixed reflection film 54 and the movable reflection film 55 are disposed so that they face each other with an inter-reflection-film gap G1 (gap) therebetween. The wavelength tunable interference filter 5 is provided with an electrostatic actuator 56, which is used to adjust (change) the size of the inter-reflection-film gap G1. The electrostatic actuator 56 is formed of a fixed electrode 561 provided on the fixed substrate 51 and a movable electrode 562 provided on the movable substrate 52. The fixed electrode 561 and the movable electrode 562 face each other with an inter-electrode gap therebetween and function as the electrostatic actuator 56.

In the following description, a plan view viewed in the substrate thickness direction of the fixed substrate 51 or the movable substrate 52, that is, a plan view in which the wavelength tunable interference filter 5 is viewed in the direction in which the fixed substrate 51, the bonding film 53, and the movable substrate 52 are layered on each other is referred to as a filter plan view.

Configuration of Fixed Substrate

The fixed substrate 51 has an electrode placement groove 511 and a reflection film attachment portion 512 formed therein in an etching process, as shown in FIG. 3. The fixed substrate 51 is formed to be thicker than the movable substrate 52 and is therefore not bent by an electrostatic attractive force produced when a voltage is applied between the fixed electrode 561 and the movable electrode 562 or internal stress produced in the fixed electrode 561.

Further, a cutout 514 is formed at a vertex C1 of the fixed substrate 51 and a movable electrode pad 564P, which will be described later, is exposed on the side of the fixed substrate 51 of the wavelength tunable interference filter 5, as shown in FIG. 2.

The electrode placement groove 511 is formed so that it has an annular shape around a plan-view center point O of the fixed substrate 51 in the filter plan view. The reflection film attachment portion 512 is formed so that it has a substantially cylindrical shape and protrudes from a central portion of the electrode placement groove 511 in the plan view described above toward the movable substrate 52. A groove bottom surface of the electrode placement groove 511 forms an electrode attachment surface 511A, on which the fixed electrode 561 (corresponding to the first electrode according to an embodiment of the invention) is disposed. Further, the front end surface of the thus protruding reflection film attachment portion 512 forms a reflection film attachment surface 512A.

Further, electrode drawing grooves 511B, which extend from the electrode placement groove 511 toward the vertices C1 and C2 at the outer circumferential edge of the fixed substrate 51, are provided in the fixed substrate 51.

The fixed electrode 561 is disposed on the electrode attachment surface 511A of the electrode placement groove 511.

More specifically, the fixed electrode 561 is formed so that it has a frame-like shape (annular shape in the present embodiment) that surrounds the fixed reflection film 54. Further, the fixed electrode 561 overlaps with the following two areas of the electrode attachment surface 511A: an area facing a movable portion 521 of the movable substrate 52, which will be described later; and an area facing a holding portion 522. That is, the fixed electrode 561 is disposed so that it covers the position corresponding to a sidewall portion 521B (corresponding to the outer circumferential edge of the movable portion according to an embodiment of the invention) of the movable portion 521, which will be described later, in the filter plan view. Further, in other words, the fixed electrode 561 is configured so that the shortest distance between the outer circumferential edges of the fixed reflection film 54 and the fixed electrode 561 is greater than the shortest distance between the outer circumferential edges of the fixed reflection film 54 and the sidewall portion 521B of the movable portion 521 in the filter plan view.

The fixed electrode 561 has a light absorbing layer 571 and a metal layer 572, which are sequentially layered on the fixed substrate 51.

The metal layer 572 is made of an electrically conductive, light blocking metal material and hence does not transmit light. Examples of the metal material of which the metal layer 572 is made include Au, Al, Ti, Ag, W, Nb, Ta, Mo, Cu, Ni, Co, Fe, Pt, and Zn.

The light absorbing layer 571 suppresses reflection of light incident through the fixed substrate 51. That is, the light absorbing layer 571 not only functions as an antireflection layer that suppresses reflection at the interface between the fixed substrate 51 and the light absorbing layer 571 but also has a function of attenuating (absorbing) light incident on the light absorbing layer 571. Examples of the material of which the light absorbing layer 571 is made include TiW, TiN, NiCr, $TiO_2$, $Al_2O_3$, $MgF_2$, $Nd_2O_3$, and $Ta_2O_5$.

The fixed electrode 561 is formed, for example, by depositing a film (TiW film, for example) that forms the light absorbing layer 571 on the fixed substrate 51, further depositing a film (Au film, for example) that form the metal layer 572, and patterning the films (TiW film and Au film) in a photolithography process. Each of the light absorbing layer 571 and the metal layer 572 has a thickness ranging, for example, from 30 to 100 nm.

A fixed drawn electrode 563 is provided on the fixed substrate 51 and extends from the outer circumferential edge of the fixed electrode 561 toward the vertex C2. A front end portion of the thus extending fixed drawn electrode 563 (portion located at vertex C2 of fixed substrate 51) forms a fixed electrode pad 563P, which is connected to the voltage controller 15. The fixed electrode pad 563P is connected, for example, to GND (ground) in the voltage controller 15.

An insulating film for ensuring insulation between the fixed electrode 561 and the movable electrode 562 may be layered on the fixed electrode 561.

The reflection film attachment portion 512 is coaxial with the electrode placement groove 511, has a substantially cylindrical shape having a diameter smaller than that of the electrode placement groove 511, and has the reflection film attachment surface 512A facing the movable substrate 52, as described above.

The fixed reflection film 54 is disposed on the reflection film attachment surface 512A, as shown in FIG. 3.

The fixed reflection film 54 disposed on the reflection film attachment surface 512A extends onto the electrode placement groove 511 in the filter plan view, as shown in FIG. 3. Part of an outer circumferential portion of the fixed reflection film 54 covers an inner circumferential portion of the fixed electrode 561 (area within predetermined dimension from inner circumferential edge thereof).

In the configuration described above, an effective diameter of light incident on the fixed reflection film 54 is defined by the inner circumferential edge of the fixed electrode 561. That is, the fixed electrode 561 functions as an aperture.

An area where the fixed electrode 561 and the fixed reflection film 54 overlap with each other (overlapping area) is formed on the electrode attachment surface 511A. Since the electrode attachment surface 511A is disposed in a position farther away from the movable substrate 52 than the reflection film attachment surface 512A in the substrate thickness direction, the fixed reflection film 54 in the overlapping area will not come into contact with the movable substrate 52 or any other film on the movable substrate 52 when the movable substrate 52 is displaced toward the fixed substrate 51.

The fixed reflection film 54 is electrically conductive and can be formed, for example, of a metal film made, for example, of Ag, Bi, or Nd or an alloy film made, for example, of an Ag alloy. The fixed reflection film 54 is in contact with the fixed electrode 561, which is a GND electrode, and hence serves as GND.

The fixed reflection film 54 may instead be formed of a reflection film formed of a metal film (or alloy film) layered on a dielectric multilayer film, for example, having a high refractive layer made of $TiO_2$ and a low refractive layer made of $SiO_2$, a reflection film formed of a dielectric multilayer film layered on a metal film (or alloy film), or a reflection film that is a laminate of a single-layer refractive layer (made, for example, of $TiO_2$ or $SiO_2$) and a metal film (or alloy film).

An antireflection film may be formed on a light incident surface of the fixed substrate 51 (surface on which fixed reflection film 54 is not provided) in a position corresponding to the fixed reflection film 54. The antireflection film can be formed by alternately layering a low refractive index film and a high refractive index film on each other, and the thus formed antireflection film decreases visible light reflectance of the surface of the fixed substrate 51 whereas increasing visible light transmittance thereof.

Part of the surface of the fixed substrate 51 that faces the movable substrate 52, specifically, the surface where the electrode placement groove 511, the reflection film attachment portion 512, or the electrode drawing grooves 511B are not formed in the etching process forms the first bonding portion 513. A first bonding film 531 is provided on the first bonding portion 513 and bonded to a second bonding film 532 provided on the movable substrate 52, whereby the fixed substrate 51 and the movable substrate 52 are bonded to each other as described above.

Configuration of Movable Substrate

The movable substrate 52 has the movable portion 521, which has a circular shape around the plan-view center point O, the holding portion 522, which is coaxial with the movable portion 521 and holds the movable portion 521, and a substrate outer circumferential portion 525, which is provided in an area outside the holding portion 522, in the filter plan view as shown in FIG. 2.

Further, the movable substrate 52 has a cutout 524 formed in correspondence with the vertex C2, and the cutout 524 exposes the fixed electrode pad 563P when the wavelength tunable interference filter 5 is viewed from the side where the movable substrate 52 is present, as shown in FIG. 2.

The movable portion 521 is formed to be thicker than the holding portion 522. In the present embodiment, for example, the movable portion 521 is formed to be as thick as the movable substrate 52. The movable portion 521 is formed so that it has a diameter greater than at least the diameter of the outer circumferential edge of the reflection film attachment surface 512A in the filter plan view. The movable electrode 562 and the movable reflection film 55 are disposed on the movable portion 521.

An antireflection film may be formed on the surface of the movable portion 521 that faces away from the fixed substrate 51, as in the case of the fixed substrate 51. The antireflection film can be formed by alternately layering a low refractive index film and a high refractive index film on each other, and the thus formed antireflection film decreases visible light reflectance of the surface of the movable substrate 52 whereas increasing visible light transmittance thereof.

The movable reflection film 55 is disposed on a central portion of a movable surface 521A of the movable portion 521 so that the movable reflection film 55 faces the fixed reflection film 54 via the inter-reflection-film gap G1. The movable reflection film 55 has the same configuration as that of the fixed reflection film 54 described above.

The movable reflection film 55 is connected to GND with a wiring line that is not shown and hence has the same potential as the potential at the fixed reflection film 54.

The movable electrode 562 is disposed on the movable surface 521A in an area around the movable reflection film 55 and has an annular shape around the plan-view center point O. The movable electrode 562 faces part the fixed electrode 561 via the inter-electrode gap G2. The area where the fixed electrode 561 and the movable electrode 562 face each other forms the electrostatic actuator 56, which corresponds to the gap changer according to an embodiment of the invention.

The movable electrode 562 has a light absorbing layer 581 and a metal layer 582, which are sequentially layered on the movable substrate 52, as in the case of the fixed electrode 561. The light absorbing layer 581 and the metal layer 582 are made of the same materials as those of the light absorbing layer 571 and the metal layer 572 of the fixed electrode 561, respectively.

A movable drawn electrode 564 is provided on the movable substrate 52 and extends from the outer circumferential edge of the movable electrode 562 toward a vertex C1 of the movable substrate 52. A front end portion of the thus extending movable drawn electrode 564 (portion located at vertex C1 of movable substrate 52) forms the movable electrode pad 564P, which is connected to the voltage controller 15. The voltage controller 15 applies a drive voltage to the movable electrode 562.

In the present embodiment, the size of the inter-electrode gap G2 is greater than the size of the inter-reflection-film gap G1 as described above by way of example, but the dimensions of the gaps are not necessarily set this way. For example, when the light under measurement is infrared light or far infrared light, the size of the inter-reflection-film gap G1 may be greater than the size of the inter-electrode gap G2 depending on the wavelength region of the light under measurement.

An insulating film for ensuring insulation between the fixed electrode 561 and the movable electrode 562 may be layered on the movable electrode 562.

The holding portion 522 is a diaphragm that surrounds the movable portion 521 and is formed to be thinner than the movable portion 521. The thus configured holding portion 522 is more readily bent than the movable portion 521 and can therefore displace the movable portion 521 toward the fixed substrate 51 under a small amount of electrostatic attractive force. Since the movable portion 521 is thicker and therefore more rigid than the holding portion 522, the movable portion 521 is not deformed when the holding portion 522 is attracted toward the fixed substrate 51 under an electrostatic attractive force. The movable reflection film 55 disposed on the movable portion 521 will therefore not be bent, whereby the fixed reflection film 54 and the movable reflection film 55 can be consistently maintained parallel to each other.

In the present embodiment, the diaphragm-shaped holding portion 522 is presented by way of example, but the holding portion 522 is not necessarily formed of a diaphragm. For example, beam-shaped holding portions disposed at equal angular intervals may be provided around the plan-view center point O.

The substrate outer circumferential portion 525 is disposed in an area outside the holding portion 522 in the filter plan view, as described above. The surface of the substrate outer circumferential portion 525 that faces the fixed substrate 51 forms the second bonding portion 523, which faces the first bonding portion 513. The second bonding film 532 is disposed on the second bonding portion 523 and bonded to the first bonding film 531, whereby the fixed substrate 51 and the movable substrate 52 are bonded to each other as described above.

Configurations of Detector, I-V Converter, Amplifier, A/D Converter, and Voltage Controller Referring back to FIG. 1, the detector 11 receives (detects) light having passed through a light interference area where the reflection films 54 and 55 of the wavelength tunable interference filter 5 face each other and outputs a detection signal based on the amount of received light.

The I-V converter 12 converts the detection signal inputted from the detector 11 into a voltage value and outputs the voltage value to the amplifier 13.

The amplifier 13 amplifies the voltage according to the detection signal (detected voltage) inputted from the I-V converter 12.

The A/D converter 14 converts the detected voltage (analog signal) inputted from the amplifier 13 into a digital signal and outputs the digital signal to the control unit 20.

The voltage controller 15 is connected to the fixed drawn electrode 563 (fixed electrode pad 563P) and the movable drawn electrode 564 (movable electrode pad 564P) of the wavelength tunable interference filter 5. The voltage controller 15 applies a voltage to the fixed electrode pad 563P and the movable electrode pad 564P and hence applies the voltage to the electrostatic actuator 56 under the control of the control unit 20. Specifically, the voltage controller 15 connects the fixed electrode pad 563P to a ground circuit to set the fixed electrode pad 563P at a ground potential. On the other hand, the voltage controller 15 sets the movable electrode pad 564P at a drive potential under the control of the control unit 20. As a result, an electrostatic attractive force is produced between the fixed electrode 561 and the movable electrode 562 of the electrostatic actuator 56 and displaces the movable portion 521 toward the fixed substrate 51. The dimension of the inter-reflection-film gap G1 is thus set at a predetermined value.

Configuration of Control Unit

The control unit 20 is, for example, a combination of a CPU, a memory, and other components and controls the overall action of the spectroscopic measurement apparatus 1. The control unit 20 includes a filter drive section 21, a light amount acquisition section 22, and a spectroscopic measurement section 23, as shown in FIG. 1.

The control unit 20 further includes a storage section 30 that stores a variety of data. The storage section specifically stores V-λ data according to which the electrostatic actuator 56 is controlled.

The recorded V-λ data contains a voltage and a peak wavelength of light that passes through the wavelength tunable interference filter 5 when the voltage is applied to the electrostatic actuator 56.

The filter drive section 21 sets a target wavelength of light to be extracted through the wavelength tunable interference filter 5 and reads a target voltage value corresponding to the set target wavelength from the V-λ data stored in the storage section 30. The filter drive section 21 then outputs a control signal to the voltage controller 15 to cause it to apply the read target voltage value. As a result, the voltage controller 15 applies a voltage having the target voltage value to the electrostatic actuator 56.

The light amount acquisition section 22 acquires the amount of light of the target wavelength having passed through the wavelength tunable interference filter 5 based on the amount of light acquired with the detector 11.

The spectroscopic measurement section 23 measures spectral characteristics of the light under measurement based on the amount of light acquired by the light amount acquisition section 22.

A spectroscopic measurement method used in the spectroscopic measurement section 23 is, for example, a method for measuring an optical spectrum by using the amount of light detected for a wavelength under measurement with the detector 11 as the amount of light of the wavelength under measurement or a method for estimating an optical spectrum based on the amounts of light of a plurality of wavelengths under measurement.

An example of the method for estimating an optical spectrum includes producing a measured spectrum matrix in which the amounts of light of a plurality of wavelengths under measurement are the matrix elements and operating a predetermined conversion matrix on the measured spectrum matrix to estimate an optical spectrum of the light under measurement. In this case, a plurality of types of sample light having known optical spectra are measured by using the spectroscopic measurement apparatus 1, and the conversion matrix is set so that a matrix produced by operating the conversion matrix on a measured spectrum matrix produced based on the measured amounts of light minimally deviates from the known optical spectra.

Advantageous Effects of First Embodiment

In the wavelength tunable interference filter 5 according to the present embodiment, the fixed electrode 561, which has an annular (frame-like) shape that surrounds the fixed reflection film 54, is provided on the fixed substrate 51. The fixed electrode 561 is formed by sequentially layering the light absorbing layer 571 and the optically opaque metal layer 572.

The thus configured fixed electrode 561 can function as an aperture because the inner circumferential edge of the fixed electrode 561 can define an effective diameter of light incident on the fixed reflection film 54. Further, even when part of light incident on the fixed substrate 51 passes therethrough and impinges on the fixed electrode 561, the antireflection capability of the light absorbing layer 571 prevents the incident light from being reflected off the light absorbing layer 571 but causes the incident light to enter the light absorbing layer 571. The light absorbing layer 571 then absorbs part of the incident light and can hence attenuate the incident light. Further, even when the light having entered the light absorbing layer 571 is reflected off the metal layer 572, the reflected light passes again through the light absorbing layer 571, whereby the reflected light is further absorbed and hence attenuated.

\*\*\*As described above, the fixed electrode 561 of the present embodiment can not only function as an aperture but also attenuate any light possibly incident on the fixed electrode 561, preventing generation of stray light. Therefore, a decrease in spectroscopic precision of the wavelength tunable interference filter 5 can be suppressed, and the amount of light of a target wavelength can be received with high precision in the optical module 10. The spectroscopic measurement apparatus 1 can therefore perform accurate spectroscopic measurement on the object X under measurement.

In the wavelength tunable interference filter 5 of the present embodiment, the inner circumferential portion of the fixed electrode 561 overlaps with the outer circumferential portion of the fixed reflection film 54. No gap is therefore created between the fixed electrode 561 and the fixed reflection film 54, avoiding an inconvenient situation in which light through a possible gap between the fixed electrode 561 and the fixed reflection film 54 forms stray light.

In the present embodiment, in particular, the inter-substrate distance in the area where the fixed electrode 561 and the fixed reflection film 54 overlap with each other (overlapping area) is greater than the inter-substrate distance at the center (plan-view center point O) of the area where the fixed reflection film 54 and the movable reflection film 55 face each other (film-facing area).

Therefore, driving the electrostatic actuator 56 will not lead to an inconvenient situation in which the movable electrode 562 on the movable portion 521 comes into contact with the fixed reflection film 54 on the fixed electrode 561.

In the wavelength tunable interference filter 5 of the present embodiment, the fixed electrode 561 overlaps with both the movable portion 521 and the holding portion 522 in the filter plan view. That is, the fixed electrode 561 is disposed so that it covers the sidewall portion 521B of the movable portion 521 or the boundary between the outer circumferential edge of the movable portion 521 and the holding portion 522. The configuration can prevent light from being incident on the sidewall portion 521B and can hence prevent stray light from being generated when light incident on the sidewall portion 521B is irregularly reflected off the sidewall portion 521B.

In the wavelength tunable interference filter 5 of the present embodiment, the fixed reflection film 54 is electrically conductive and electrically connected to the fixed electrode 561. Any electrostatic charge accumulated on the fixed reflection film 54 can therefore be removed. Therefore, when the size of the gap between the reflection films is changed, no undesirable electrostatic attractive force acts on the reflection films, whereby a decrease in reflection film drive precision due to a possible electrostatic attractive force can be avoided.

In the wavelength tunable interference filter 5 of the present embodiment, the fixed electrode 561 functions not only as a drive electrode that forms the electrostatic actuator 56 but also as an aperture. The configuration eliminates a need to provide the drive electrode and the aperture separately, whereby the size of the wavelength tunable interference filter 5 can be reduced.

In the wavelength tunable interference filter 5 of the present embodiment, the fixed substrate 51 is made of a glass material. On the other hand, the light absorbing layer 571 is made, for example, of TiW, TiN, NiCr, $TiO_2$, $Al_2O_3$, $MgF_2$, $Nd_2O_3$, or $Ta_2O_5$ and formed on the fixed substrate 51. Further, the metal layer 572 is formed on the light absorbing layer 571.

The thus formed light absorbing layer 571 is in intimate contact with the metal layer 572 and the fixed substrate 51, which is made of a glass material, whereby the metal layer 572 and the fixed substrate 51 can be reliably connected to each other. Further, the light absorbing layer 571 can suppress reflection at the interface between the light absorbing layer 571 and the fixed substrate 51, whereby generation of stray light can be more effectively suppressed.

In the wavelength tunable interference filter 5 of the present embodiment, the metal layer 572 is made of a highly electrically-conductive, light-blocking material, such as Au, Al, Ti, Ag, W, Nb, Ta, Mo, Cu, Ni, Co, Fe, Pt, or Zn. The metal layer 572 can therefore be preferably used as an electrode and an aperture.

Second Embodiment

A second embodiment according to the invention will next be described with reference to the drawings.

The present embodiment differs from the first embodiment described above in that the fixed electrode covers the sidewall of the reflection film attachment portion 512.

Figure 4:
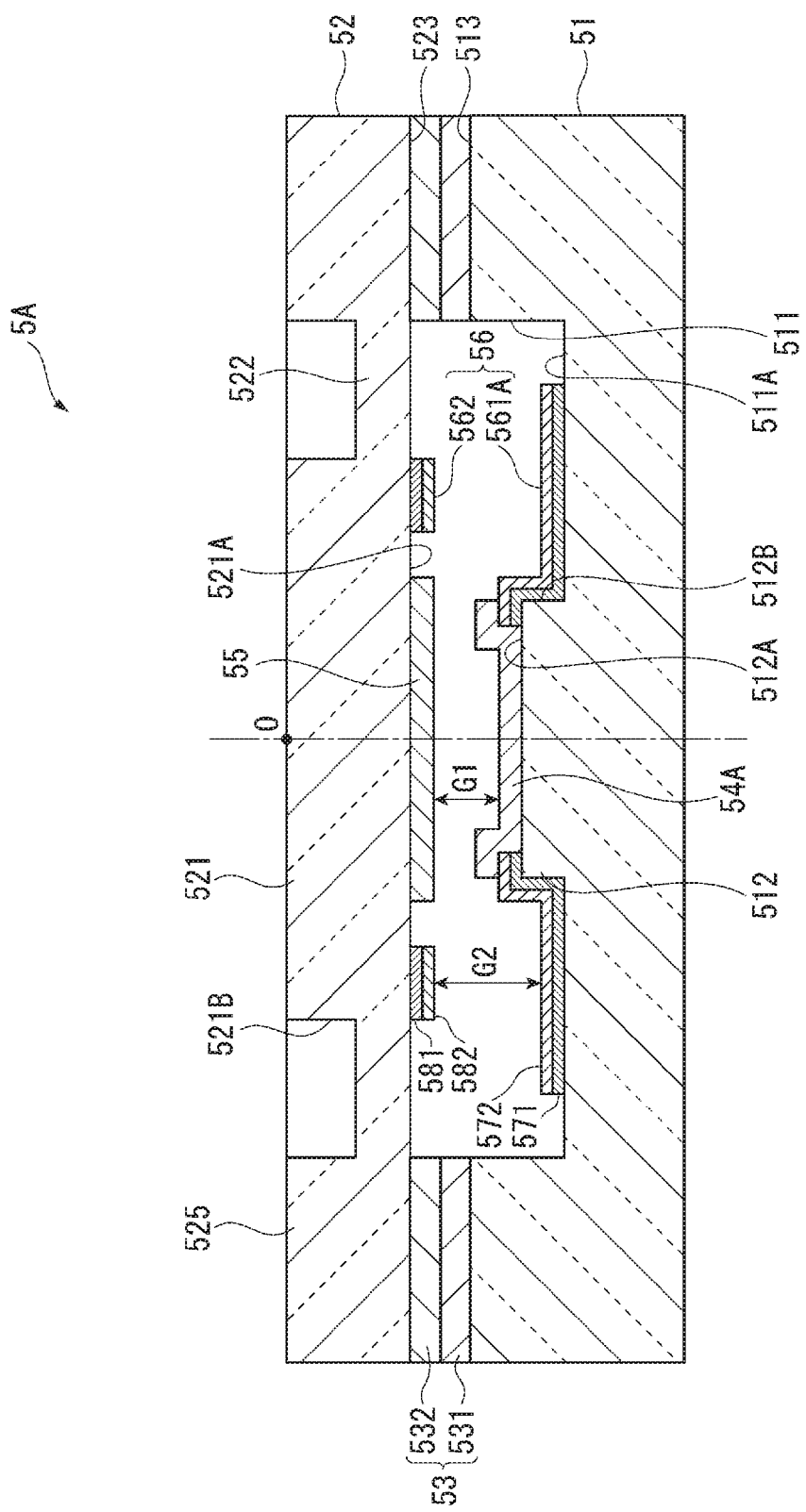
FIG. 4 is a cross-sectional view showing a schematic configuration of a wavelength tunable interference filter of a second embodiment.

FIG. 4 is a cross-sectional view showing a schematic configuration of a wavelength tunable interference filter 5A of the second embodiment according to the invention. The wavelength tunable interference filter 5A basically has the same configuration as that of the wavelength tunable interference filter 5 of the first embodiment except the difference described above. In the following description of the present embodiment, the components having been already described have the same reference characters and descriptions thereof will be omitted or simplified.

A fixed electrode 561A has an inner circumferential edge located on the reflection film attachment surface 512A and covers a sidewall portion 512B of the reflection film attachment portion 512, as shown in FIG. 4.

Further, a fixed reflection film 54A is provided so that an outer circumferential portion thereof covers an inner circumferential portion of the fixed electrode 561A, which is provided on the electrode attachment surface 511A, in the filter plan view.

Advantageous Effect of Second Embodiment

In the wavelength tunable interference filter 5A of the present embodiment, the fixed reflection film 54A located inside the inner circumferential edge of the fixed electrode 561A is uniformly separated from the movable reflection film 55. The wavelength tunable interference filter 5A can therefore transmit light of a desired target wavelength more precisely, whereby the spectroscopic precision can be further improved.

Third Embodiment

A third embodiment according to the invention will next be described with reference to the drawings.

The present embodiment differs from the first embodiment described above in that the fixed electrode 561 is provided on one surface of the fixed substrate 51 and a stress relaxation film is provided on the other surface of the fixed substrate 51 with the stress relaxation film facing the fixed electrode 561 through the fixed substrate 51.

Figure 5:
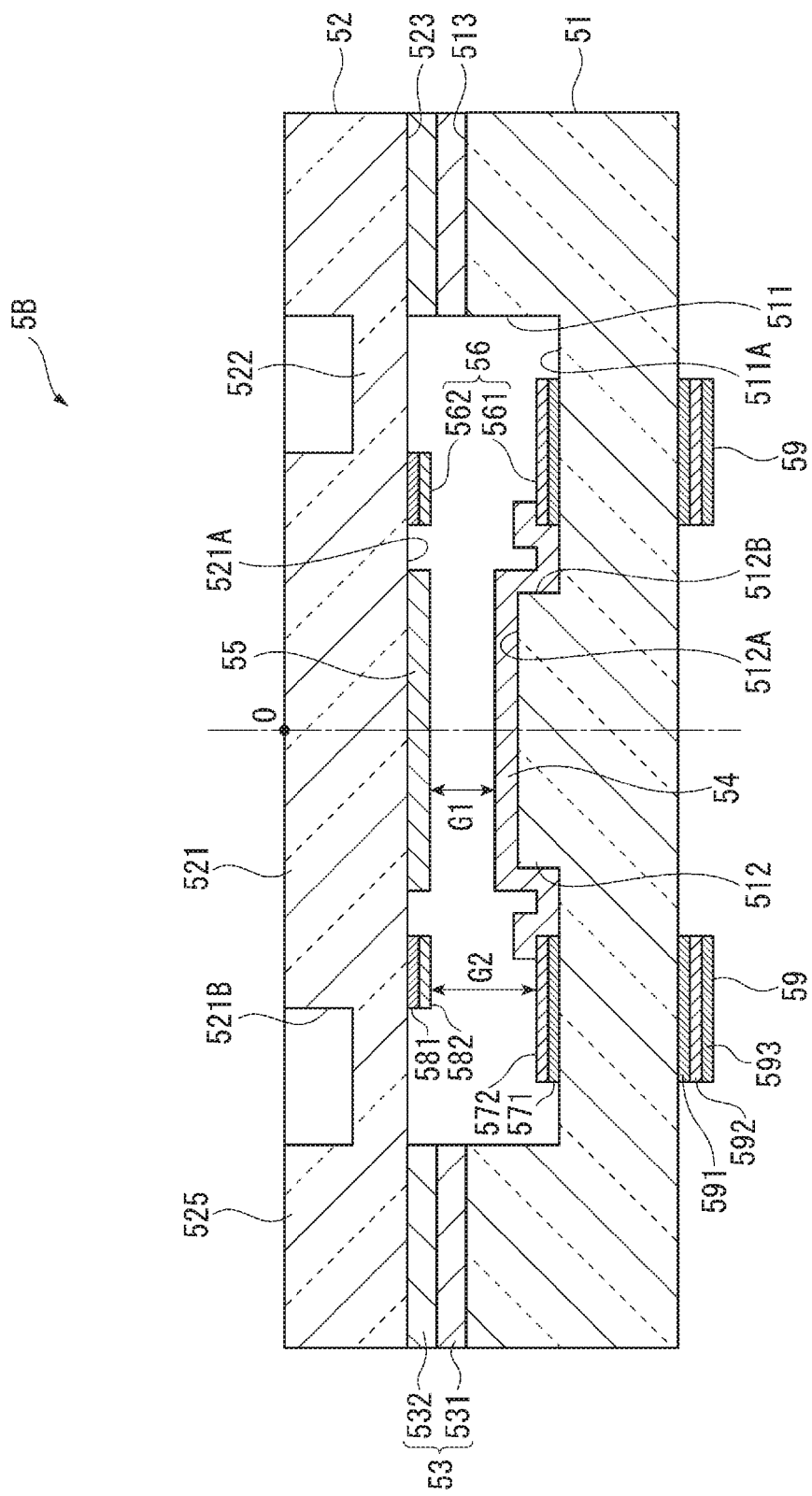
FIG. 5 is a cross-sectional view showing a schematic configuration of a wavelength tunable interference filter of a third embodiment.

FIG. 5 is a cross-sectional view showing a schematic configuration of a wavelength tunable interference filter 5B of the third embodiment according to the invention.

In the wavelength tunable interference filter 5B of the present embodiment, a stress relaxation film 59 is provided on the surface of the fixed substrate 51 that faces away from the surface on which the fixed electrode 561 is provided and is located so that the stress relaxation film 59 coincides with the fixed electrode 561 in the filter plan view, as shown in FIG. 5. The stress relaxation film 59 has a first light absorbing layer 591, a metal layer 592, and a second light absorbing layer 593, which are sequentially layered on the fixed substrate 51.

The metal layer 592 is made of the same material as that of the metal layer 572 and has the same thickness as that of the metal layer 572. The metal layer 592 therefore exerts internal stress having the following magnitude and direction on the fixed substrate 51: The magnitude is the same as that of internal stress exerted on the fixed substrate 51 by the metal layer 572: but the direction is opposite to that of the internal stress exerted by the metal layer 572, whereby the overall internal stress exerted on the fixed substrate 51 is relaxed (canceled).

The first light absorbing layer 591, which is made of the same material as that of the light absorbing layer 571, suppresses reflection of light incident through the fixed substrate 51 and attenuates the incident light.

The second light absorbing layer 593, which is also made of the same material as that of the light absorbing layer 571, and when part of incident light incident on the wavelength tunable interference filter is incident on the stress relaxation film 59, the second light absorbing layer 593 suppresses reflection of the incident light and attenuates the incident light.

Advantageous Effects in Third Embodiment

In the wavelength tunable interference filter 5B of the present embodiment, the stress relaxation film 59 is provided on the surface of the fixed substrate 51 that faces away from the surface on which the fixed electrode 561 is provided with the stress relaxation film 59 facing the fixed electrode 561 through the fixed substrate 51, and the stress relaxation film 59 has the two light absorbing layers 591 and 593 and the metal layer 592 disposed between the light absorbing layers 591 and 593. The metal layer 592 has the same configuration as that of the metal layer 572 of the fixed electrode 561, and each of the two light absorbing layers 591 and 593 has the same configuration as that of the light absorbing layer 571.

The metal layer 592 can therefore cancel the internal stress in the metal layer 572 of the fixed electrode 561 and hence suppress deformation of the fixed substrate 51.

Further, the first light absorbing layer 591 can suppress reflection of light incident through the fixed substrate 51 and attenuate the incident light. Therefore, even when part of light incident on the fixed electrode 561 is not sufficiently attenuated but reflected off the fixed electrode 561, the reflected light is incident on the stress relaxation film 59 and attenuated therein, whereby stray light can be further suppressed.

Moreover, even when part of the light incident on the wavelength tunable interference filter 5B is incident on the stress relaxation film 59, the second light absorbing layer 593 can attenuate light reflected off the metal film 592 and hence suppress stray light.

As described above, the stress relaxation film 59 can relax stress produced by the fixed electrode 561 and can more reliably suppress generation of stray light.

In the present embodiment, since the metal layer 592 is made of the same material as that of the metal layer 572 and has the same shape as that of the metal layer 572, the metal layer 592 can be readily formed so that it has a stress relaxation capability. However, the metal layer 592 is not necessarily made of the same material as that of the metal layer 572 or does not necessarily have the same shape as that of the metal layer 572 but may be made of an arbitrary material and may have an arbitrary shape as long as the resultant metal film can exert stress that relaxes the stress produced by the metal layer 572 on the fixed substrate 51. In particular, the diameter of the inner circumferential edge of the stress relaxation film 59 may be set to be smaller than the diameter of the reflection film attachment surface 512A. In this case, the range through which light is incident on the reflection film 54 is defined so that the light is incident only on an area where the dimension of the gap G1 between the reflection films 54 and 55 is substantially the same.

Fourth Embodiment

A fourth embodiment according to the invention will next be described with reference to the drawings.

The present embodiment differs from the first embodiment described above in that the movable electrode is formed of a plurality of partial electrodes.

Figure 6:
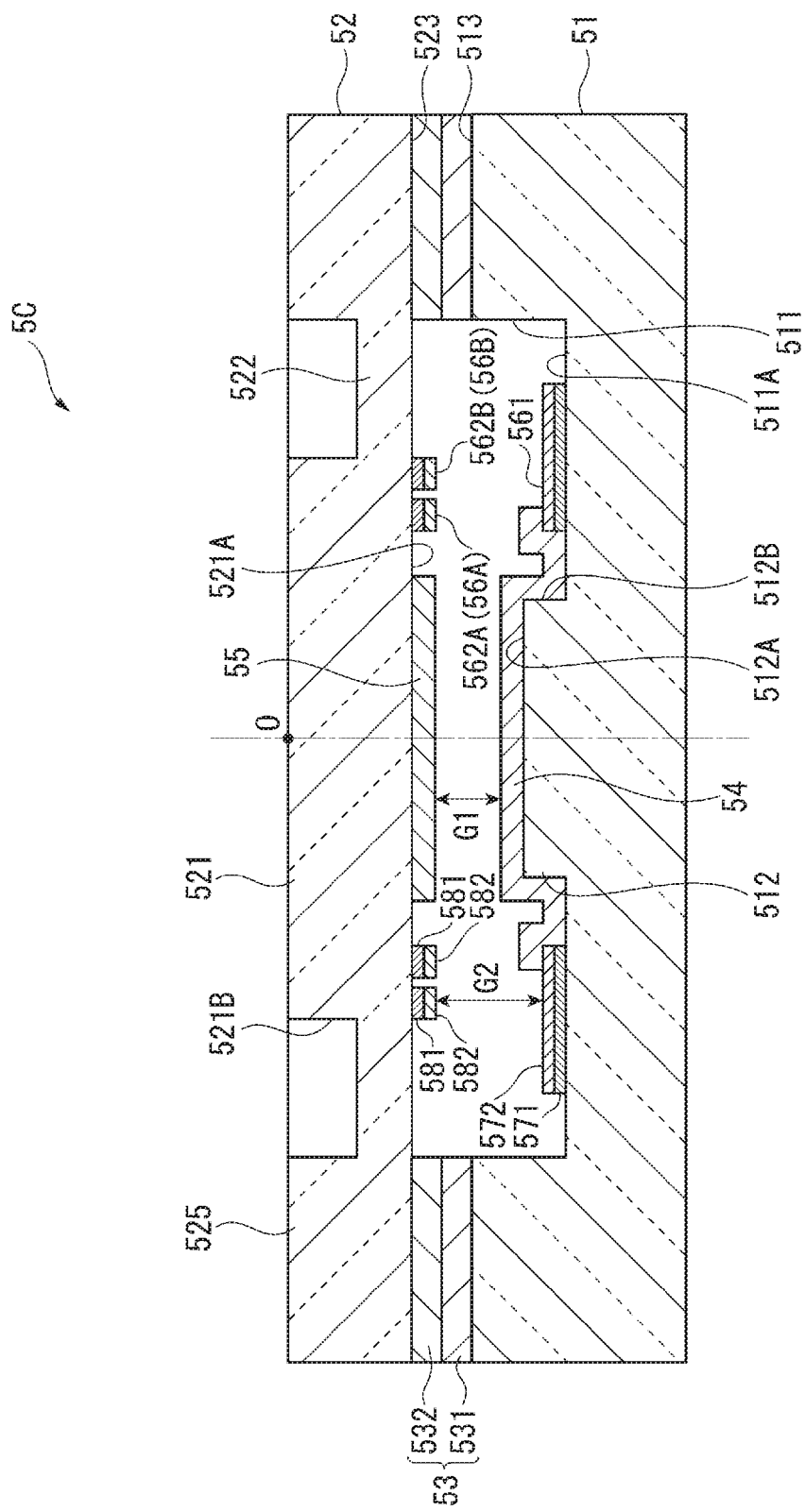
FIG. 6 is a cross-sectional view showing a schematic configuration of a wavelength tunable interference filter of a fourth embodiment.

FIG. 6 is a cross-sectional view showing a schematic configuration of a wavelength tunable interference filter 5C of the fourth embodiment according to the invention.

The wavelength tunable interference filter 5C of the present embodiment includes the following two movable electrodes on the movable surface 521A of the movable substrate 52 as shown in FIG. 6: a first movable electrode 562A having a substantially C-like shape around the plan-view center point O; and a second movable electrode 562B having a substantially C-like shape and provided in an area outside the first movable electrode 562A in the filter plan view.

The first movable electrode 562A and the second movable electrode 562B are spaced apart from each other. That is, in the present embodiment, a dual-electrode structure in which inner and outer two movable electrodes are disposed in the filter plan view is provided.

Although not shown, the first movable electrode 562A is provided with a movable drawn electrode extending from the outer circumferential edge of the first movable electrode 562A toward one of the vertices of the movable substrate 52, and a front end portion of the thus extending movable drawn electrode (a portion located at the vertex of the movable substrate 52) forms a movable electrode pad connected to the voltage controller 15.

Similarly, the second movable electrode 562B is provided with a movable drawn electrode extending from the outer circumferential edge of the second movable electrode 562B toward another vertex of the movable substrate 52, and a front end portion of the thus extending movable drawn electrode forms a movable electrode pad connected to the voltage controller 15.

The fixed electrode 561 is an electrode common to the first movable electrode 562A and the second movable electrode 562B and is connected, for example to the GND circuit in the voltage controller 15. The area where the fixed electrode 561 and the first movable electrode 562A face each other forms a first electrostatic actuator 56A, and the area where the fixed electrode 561 and the second movable electrode 562B face each other forms a second electrostatic actuator 56B.

In the thus configured wavelength tunable interference filter 5C, different voltages can be applied to the first movable electrode 562A and the second movable electrode 562B.

Advantageous Effects of Fourth Embodiment

In the wavelength tunable interference filter 5C of the present embodiment, the movable electrode 562 is formed of the first movable electrode 562A and the second movable electrode 562B, that is, a plurality of partial electrodes, and the fixed electrode 561 serves as an electrode common to the partial electrodes. As a result, the fixed electrode 561 is allowed to function as an aperture and can suppress stray light, as in the first to third embodiments. In addition, setting the first movable electrode 562A and the second movable electrode 562B at different potentials allows the first electrostatic actuator 56A and the second electrostatic actuator 56B to produce different electrostatic attractive forces, whereby the dimension of the gap between the reflection films can be more precisely controlled for high-precision spectroscopy.

Fifth Embodiment

A fifth embodiment according to the invention will next be described with reference to the drawings.

The present embodiment differs from the first embodiment described above in that a mirror electrode 551 is connected to the movable reflection film 55.

Figure 7:
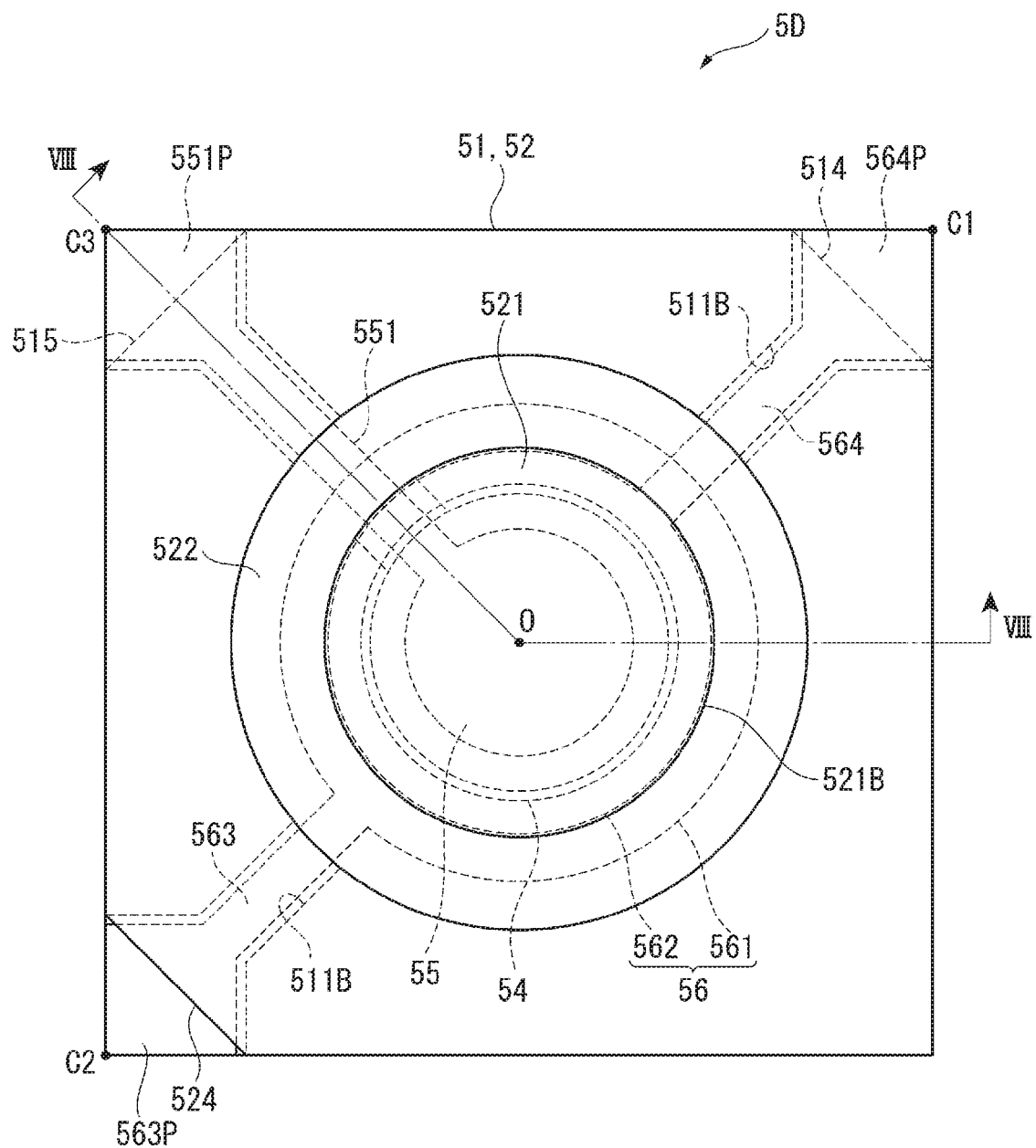
FIG. 7 is a plan view showing a schematic configuration of a wavelength tunable interference filter of a fifth embodiment.

FIG. 7 is a plan view showing a schematic configuration of a wavelength tunable interference filter 5D of the present embodiment.

Figure 8:
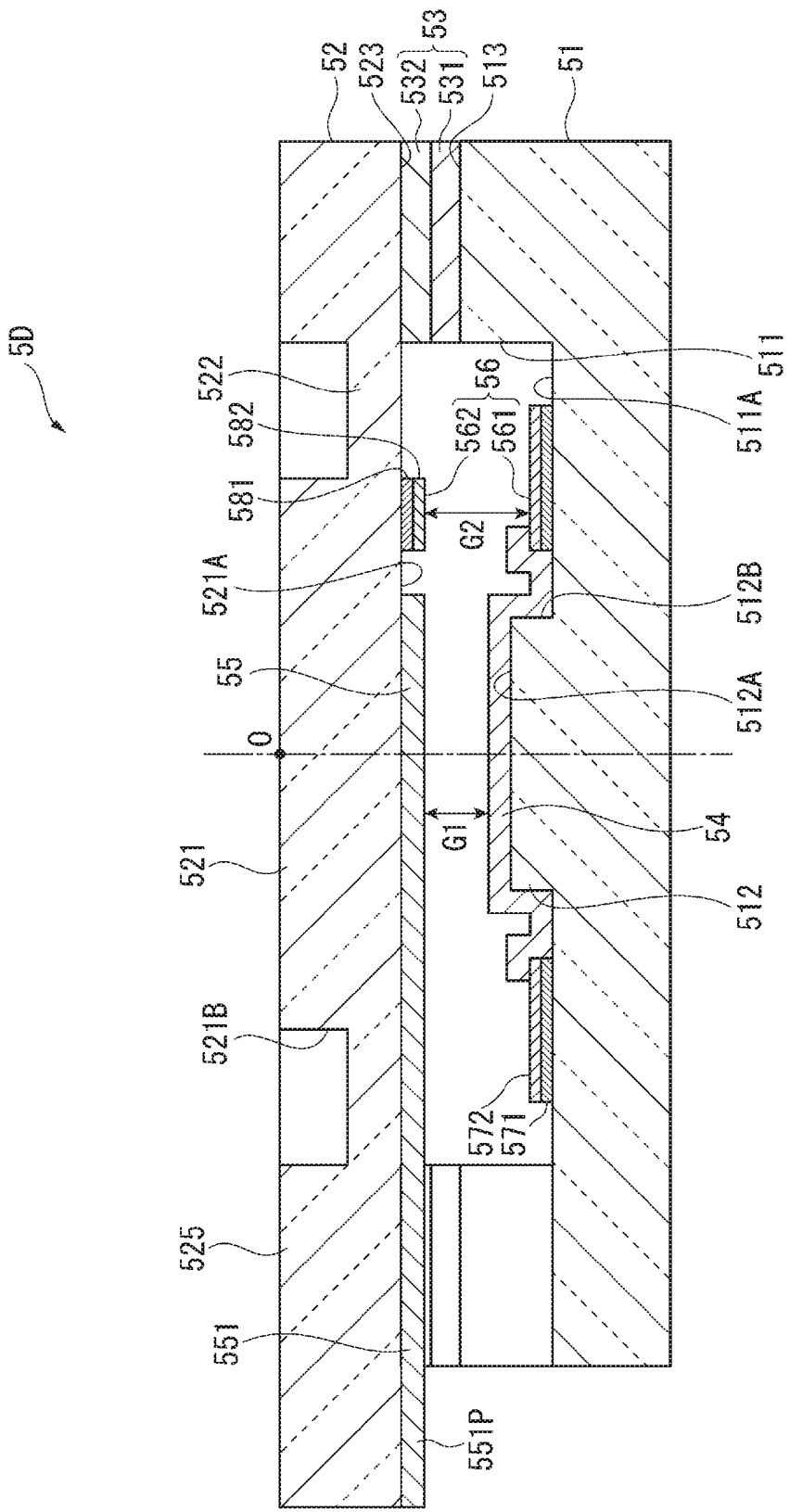
FIG. 8 is a cross-sectional view showing the schematic configuration of the wavelength tunable interference filter of the fifth embodiment.

FIG. 8 is a cross-sectional view of the wavelength tunable interference filter taken along the line VIII-VIII in FIG. 7.

In the wavelength tunable interference filter 5D of the present embodiment, the movable electrode 562 has a substantially C-like shape. On the movable substrate 52 is provided a mirror electrode 551 connected to the movable reflection film 55, passing through the opening of the C-shaped movable electrode 562, and extending to a vertex C3. When the movable reflection film 55 is formed of a metal film made, for example, of an Ag alloy, the mirror electrode 551 can be formed simultaneously with the movable reflection film 55.

Further, a front end portion of the mirror electrode 551 (portion located at vertex C3 of movable substrate 52) forms a mirror electrode pad 551P, which is connected to the voltage controller 15.

The voltage controller 15 connects the fixed electrode pad 563P and the mirror electrode pad 551P to the ground circuit to set the two pads at the ground potential (0 V).

The fixed substrate 51 has a cutout 515 formed at the vertex C3, and the cutout 515 exposes the mirror electrode pad 551P.

Advantageous Effect of Fifth Embodiment

In the present embodiment, the mirror electrode 551, which is connected to the movable reflection film 55, is set at the ground potential. The movable reflection film 55 will therefore not be charged. As a result, generation of an electrostatic attractive force between the reflection films and 55 can be more reliably prevented, whereby the electrostatic actuator 56 can be driven more precisely.

The present embodiment has been described with reference to the case where the voltage controller 15 connects the pads 551P and 563P to the ground circuit to set them at the ground potential, but the pads 551P and 563P are not necessarily set at the ground potential. For example, the pads 551P and 563P may be set at a predetermined common potential. In this case as well, the fixed reflection film 54 and the movable reflection film 55 can have the same amount of charge, whereby no electrostatic attractive force will be generated.

Variation of Fifth Embodiment

The above fifth embodiment has been described with reference to the case where the voltage controller 15 connects the pads 551P and 563P to the ground circuit to set the fixed reflection film 54 and the movable reflection film 55 at the ground potential, but the pads 551P and 563P are not necessarily connected to the ground circuit.

For example, the voltage controller 15 may connect the pads 551P and 563P to a capacitance detection circuit the voltage controller 15.

In this case, the capacitance detection circuit can apply a high-frequency voltage between the fixed reflection film 54 and the movable reflection film 55 to detect the capacitance between the reflection films 54 and 55, that is, the dimension of the gap G1 between the reflection films 54 and 55.

Sixth Embodiment

A sixth embodiment according to the invention will next be described with reference to the drawings.

In the spectroscopic measurement apparatus 1 of the first embodiment described above, the wavelength tunable interference filter 5 is directly accommodated in the optical module 10. Some optical modules have complicated configurations, and it is in some cases difficult to directly accommodate the wavelength tunable interference filter 5 particularly in a compact optical module. In the present embodiment, a description will be made of an optical filter device that allows the wavelength tunable interference filter 5 to be readily accommodated in such a compact optical module.

Figure 9:
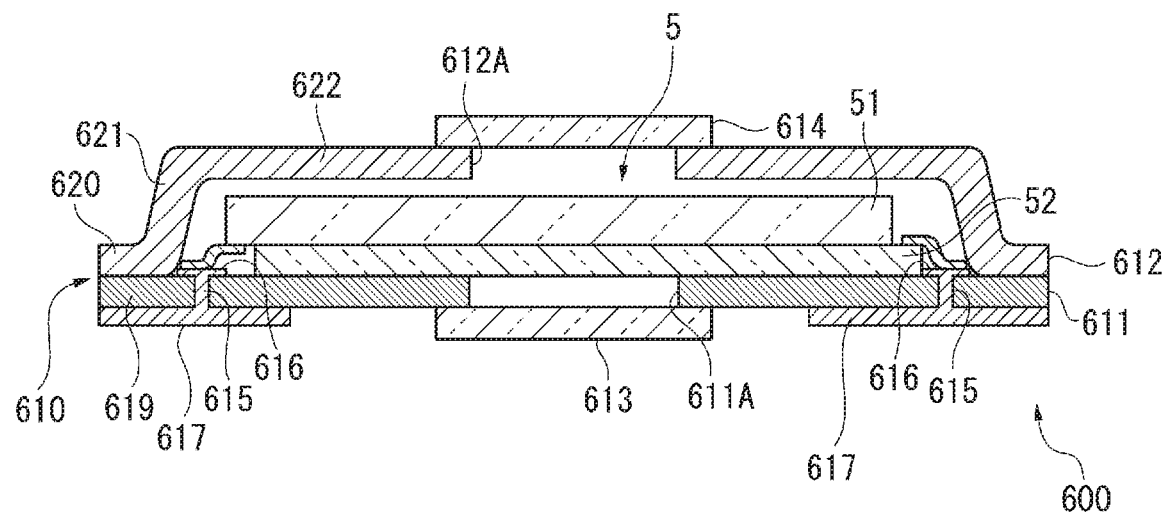
FIG. 9 is a cross-sectional view showing a schematic configuration of an optical filter device of a sixth embodiment.

FIG. 9 is a cross-sectional view showing a schematic configuration of an optical filter device of the sixth embodiment according to the invention.

An optical filter device 600 includes an enclosure 610, which accommodates the wavelength tunable interference filter 5, as shown in FIG. 9.

The enclosure 610 has a bottom 611, a lid 612, a light-exiting-side glass window 613 (light guide portion), and a light-incident-side glass window 614 (light guide portion).

The bottom 611 is formed, for example, of a single-layer ceramic substrate. The movable substrate 52 of the wavelength tunable interference filter 5 is disposed on the bottom 611. Further, a light exiting hole 611A is formed as an opening through the bottom 611 in an area facing the reflection films (fixed reflection film 54 and movable reflection film 55) of the wavelength tunable interference filter 5. The light exiting hole 611A is a window through which light separated and extracted by the wavelength tunable interference filter 5 passes, and the light-exiting-side glass window 613 is bonded to the bottom 611 in a portion around the light exiting hole 611A. The light-exiting-side glass window 613 can be bonded to the bottom 611, for example, in a glass frit bonding process in which a glass raw material is melted at a high temperature and the molten glass material is rapidly cooled to produce glass frit that is formed of rapidly cooled glass pieces.

Terminals 616 are provided on the upper surface of the bottom 611 (inside enclosure 610), and the number of terminals 616 corresponds to the electrode pads 563P and 564P of the wavelength tunable interference filter 5. A through hole 615 is formed through the bottom 611 in a position where each of the terminals 616 is disposed, and each of the terminals 616 is connected via the through hole 615 to a connection terminal 617, which is provided on the lower surface of the bottom 611 (outside enclosure 610).

The bottom 611 has a sealer 619 provided along the outer circumferential edge thereof, and the sealer 619 is boned to the lid 612.

The lid 612 has a sealer 620, which is bonded to the sealer 619 of the bottom 611, a sidewall 621, which continuously extends from the sealer 620 upward in a direction away from the bottom 611, and a top plate 622, which covers the fixed substrate 51 of the wavelength tunable interference filter 5, as shown in FIG. 9. The lid 612 can be made of an alloy, such as kovar, or a metal.

The lid 612 is boned to the bottom 611 by bonding the sealer 620 to the sealer 619 of the bottom 611, for example, in a laser sealing process. A light incident hole 612A is formed as an opening through the top plate 622 of the lid 612 in correspondence with the area where the reflection films 54 and 55 of the wavelength tunable interference filter 5 face each other. The light incident hole 612A is a window through which light that is desired to undergo spectroscopic operation performed by the wavelength tunable interference filter 5 (light under measurement) passes, and the light-incident-side glass window 614 is bonded to the lid 612 in a portion around the light incident hole 612A.

Advantageous Effects of Sixth Embodiment

In the optical filter device 600 of the present embodiment, light having passed through the fixed substrate 51 will not be reflected off the area where the fixed electrode 561 is formed, and no stray light will therefore be generated from any possible light reflected off the inner wall of the enclosure 610, as in the first embodiment described above.

Further, in the optical filter device 600 of the present embodiment, since the enclosure 610 protects the wavelength tunable interference filter 5, the wavelength tunable interference filter 5 will not be damaged due to external factors. The wavelength tunable interference filter 5 will therefore not be damaged due to impact and other types of interaction with other members when the wavelength tunable interference filter 5 undergoes installation and maintenance.

Moreover, for example, when the wavelength tunable interference filter 5 manufactured in a factory is transported, for example, to an assembly line where an optical module or an electronic apparatus is assembled, the wavelength tunable interference filter 5 protected by the optical filter device 600 can be safely transported.

Further, since the optical filter device 600 is provided with the exposed connection terminals 617 disposed on the outer circumferential surface of the enclosure 610, wiring can be readily performed when the optical filter device 600 is incorporated in an optical module or an electronic apparatus.

Variation of Sixth Embodiment

Figure 10:
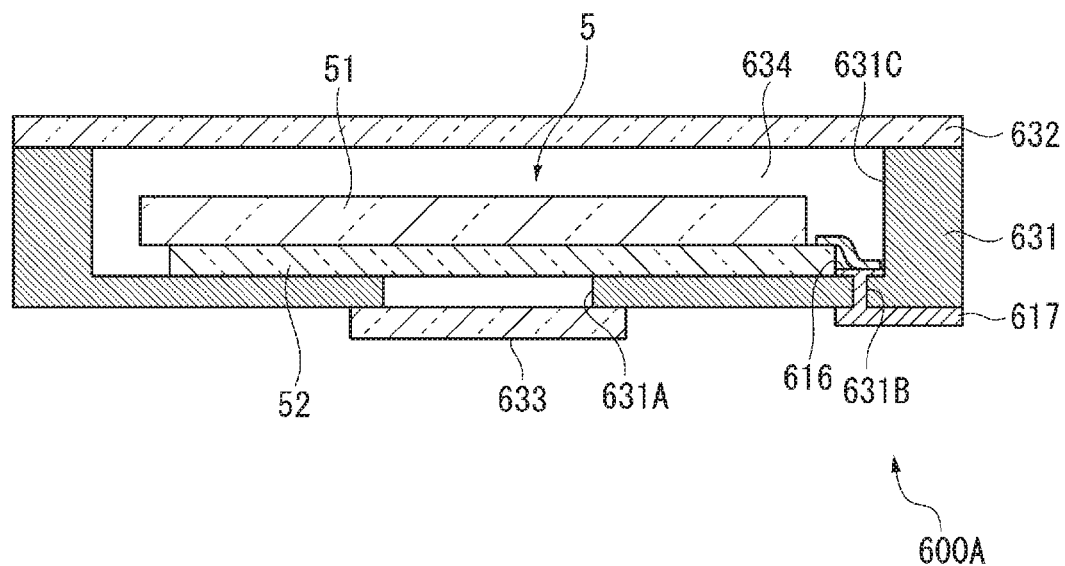
FIG. 10 is a cross-sectional view showing a schematic configuration a variation of the optical filter device.

FIG. 10 is a cross-sectional view showing a schematic configuration of an optical filter device according to a variation of the sixth embodiment described above.

An optical filter device 600A includes a ceramic substrate 631, which has a filter accommodation portion 631C, which is a recess that accommodates the wavelength tunable interference filter 5, and a glass lid 632, which covers the filter accommodation portion 631C, as shown in FIG. 10. The optical filter device 600A is configured so that the glass lid 632 is bonded to the ceramic substrate 631 to seal an internal space 634 with the wavelength tunable interference filter 5 accommodated in the filter accommodation portion 631C.

A light exiting hole 631A is formed as an opening in the ceramic substrate 631, which faces the glass lid 632, and extends in the thickness direction of the substrate. A light-exiting-side glass window 633 is bonded to the ceramic substrate 631 in a portion around the light exiting hole 631A.

Further, the ceramic substrate 631 is provided with a terminal 616, through which electric power is supplied to the wavelength tunable interference filter 5. A through hole 631B is further formed through the ceramic substrate 631 in a position where the terminal 616 is disposed, and the terminal 616 is connected through the through hole 631B to a connection terminal 617 provided on the lower surface of the ceramic substrate 631.

In the optical filter device 600A of the present variation, light incident through the glass lid 632 is incident on the wavelength tunable interference filter 5, and light separated by the wavelength tunable interference filter 5 exits through the light exiting hole 631A. The present variation can also provide the same advantageous effects as those provided in the sixth embodiment described above.

In the optical filter device 600A, the lid on the light incident side is made of a glass material and can hence transmit light. Therefore, even when part of incident light is reflected off the fixed electrode 561 provided in the wavelength tunable interference filter 5, the reflected light passes through the glass lid 632 toward the light incident side. No stray light is therefore generated due to reflection at the fixed electrode 561.

Other Embodiments

The invention is not limited to the embodiments described above, but variations, improvements, and other modifications fall within the scope of the invention to the extent that they can achieve the advantage of the invention.

For example, the fixed electrode 561 has a two-layer configuration in which the light absorbing layer 571 and the metal layer 572 are sequentially layered on the fixed substrate 51, but the invention is not necessarily configured this way. The fixed electrode 561 may have a configuration which has three or more layers and in which other layers are provided between the fixed substrate 51 and the light absorbing layer 571 and between the light absorbing layer 571 and the metal layer 572. For example, a transparent electrode layer made, for example, of ITO may be provided between the fixed substrate 51 and the light absorbing layer 571.

In each of the embodiments described above, the configuration in which the inner circumferential portion of the fixed electrode 561, which serves as an aperture, overlaps with the outer circumferential portion of the fixed reflection film 54 is presented by way of example, but the invention is not necessarily configured this way. For example, the side surface of the inner circumferential edge of the fixed electrode 561 may be in contact with the side surface of the outer circumferential edge of the fixed reflection film 54 so that the portion inside the fixed electrode 561 forms the fixed reflection film 54.

Instead, for example, the inner circumferential portion of the fixed electrode 561, which serves as an aperture, may overlap with at least part of the outer circumferential portion of the fixed reflection film 54. In this case as well, the fixed electrode 561 and the fixed reflection film 54 that overlap with each other produce no portion between the fixed electrode 561 and the fixed reflection film 54 through which light transmits.

In each of the embodiments described above, the fixed electrode 561, which is an aperture electrode, is present on both sides of the sidewall portion 521B of the movable portion 521, which is the boundary between the outer circumferential edge of the movable portion 521 and the holding portion 522, but the invention is not necessarily configured this way. That is, the fixed electrode 561 may be provided so that it covers at least an area around the fixed reflection film 54 or may be provided only in an area inside the portion facing the holding portion 522 in the filter plan view.

Further, the fixed electrode 561 may be provided at least in an area around the fixed reflection film 54. For example, the fixed electrode 561 may be provided so that it surrounds part of the circumference of the fixed reflection film 54. In this case as well, in the area where the fixed electrode 561 is disposed, the range of incident light can be defined and generation of stray light resulting from light reflected off the metal layer 572 of the fixed electrode 561 can be suppressed.

The above fifth embodiment has been described with reference to the case where the movable reflection film 55 is set at the GND potential for charge removal and the case where the fixed reflection film 54 and the movable reflection film 55 are allowed to function as electrodes for electrostatic capacitance detection. Further, the fixed reflection film 54 and the movable reflection film 55 may be allowed to function as an electrostatic actuator for driving themselves.

In each of the embodiments described above, each of the reflection films 54 and 55 is electrically conductive but may be made of a non-electrically-conductive material. For example, each of the fixed reflection film 54 and the movable reflection film 55 may be formed, for example, of a dielectric multilayer film having no electrically conductive layer.

In each of the embodiments described above, the fixed electrode 561 provided on the fixed substrate 51 serves as an aperture electrode, but the invention is not necessarily configured this way. That is, the movable electrode 562 provided on the movable substrate 52 may serve as an aperture electrode, or each of the fixed electrode 561 and the movable electrode 562 may serve as an aperture electrode.

In each of the embodiments and the variations described above, the electrostatic actuator is presented as the gap changer by way of example, but the gap changer is not limited to an electrostatic actuator. For example, the gap changer may be an induction actuator having a first induction coil provided in place of the fixed electrode 561 and a second induction coil or a permanent magnet provided in place of the movable electrode 562. The gap changer may instead be any driver capable of changing the inter-reflection-film gap G1, such as a configuration in which a piezoelectric device is used to displace the movable portion 521 and a configuration in which the inter-reflection-film gap is changed based on air pressure.

In the embodiments and the variations described above, the wavelength tunable interference filters 5, 5A, 5B, 5C, and 5D, each of which is a wavelength tunable Fabry-Perot etalon, have been described, but the invention is not necessarily configured this way. That is, each of the wavelength tunable interference filters may be a wavelength-fixed Fabry-Perot etalon including no electrostatic actuator 56 (gap changer). In this case, the aperture electrode in each of the embodiments of the invention can be used as the electrostatic capacitance detection electrode described above, the charge prevention electrode described above, or other electrodes for other purposes.

In the embodiments and the variations described above, each of the wavelength tunable interference filters 5, 5A, 5B, 5C, and 5D is configured by way of example so that the fixed reflection film 54, which is a first reflection film, is provided on the fixed substrate 51 and the movable reflection film 55, which is a second reflection film, is provided on the movable substrate 52, but the invention is not necessarily configured this way. For example, each of the reflection films may not be provided on a substrate. In this case, for example, after a first electrode and the first reflection film are provided on one surface of a parallel glass substrate, and a second electrode and the second reflection film are provided on the other surface, which is parallel to the one surface, the parallel glass substrate is etched away, for example, in an etching process. In this configuration, in which no substrate is provided, the thickness of the spectroscopic device can be further reduced. In this case, the dimension of the gap between the reflection films can be maintained by providing a spacer or any other component interposed between the first reflection film and the second reflection film.

In each of the embodiments described above, the spectroscopic measurement apparatus 1 is presented as the electronic apparatus according to an embodiment of the invention by way of example. The wavelength tunable interference filter 5, the optical module, and the electronic apparatus according to the embodiments of the invention are applicable to a variety of fields as well as the example described above.

For example, the electronic apparatus according to the embodiment of the invention is applicable to a colorimetry apparatus for color measurement.

Figure 11:
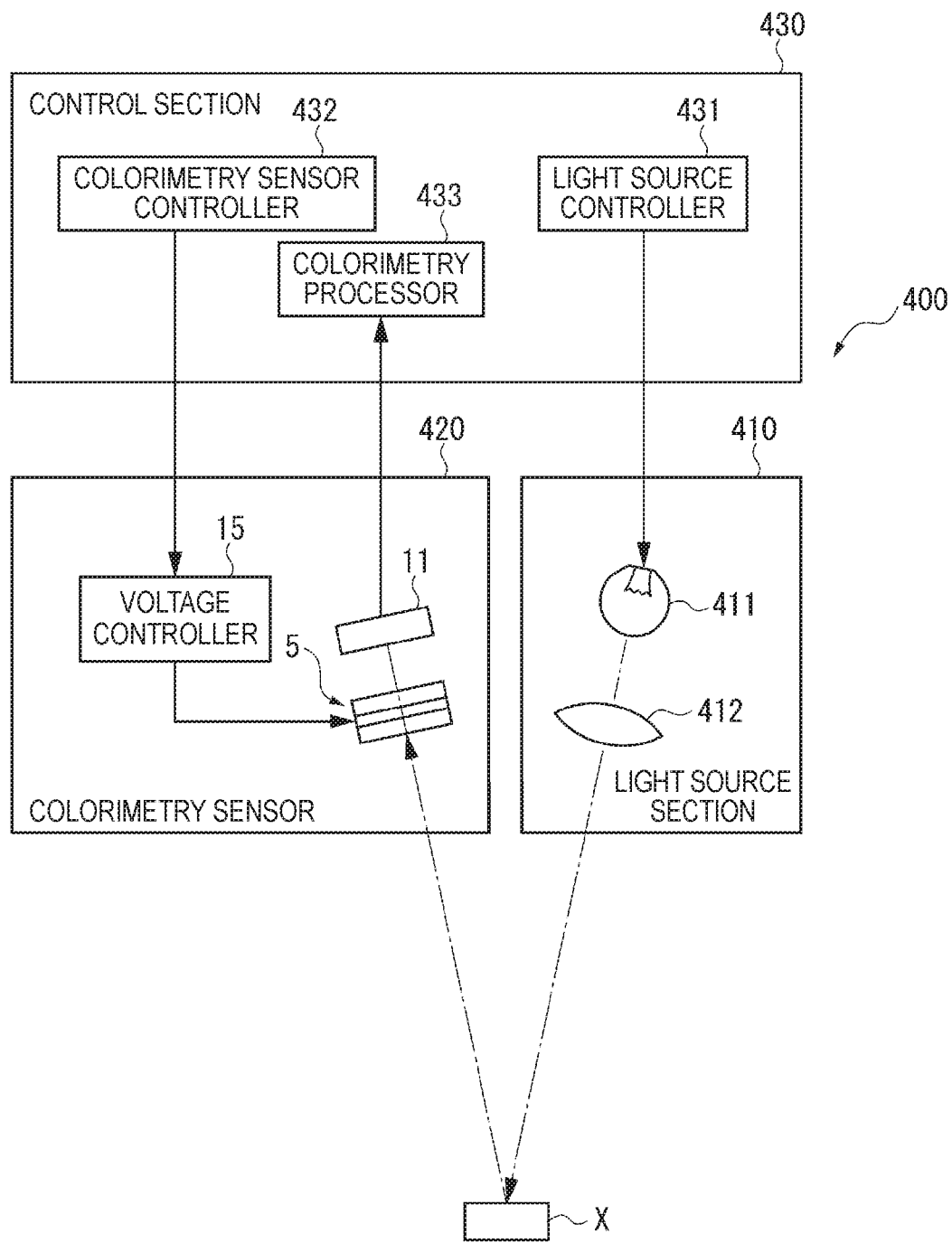
FIG. 11 shows a schematic configuration of a colorimetry apparatus (electronic apparatus) including any of the wavelength tunable interference filters according to the embodiments of the invention.

FIG. 11 is a block diagram showing an example of a colorimetry apparatus 400 including the wavelength tunable interference filter 5.

The colorimetry apparatus 400 includes a light source section 410, which outputs light toward an object X under measurement, a colorimetry sensor 420 (optical module), and a control section 430 (control unit), which controls overall action of the colorimetry apparatus 400, as shown in FIG. 11. The colorimetry apparatus 400 operates as follows: The light outputted from the light source section 410 is reflected off the object X under measurement; the colorimetry sensor 420 receives the reflected light under measurement; and the chromaticity of the light under measurement, that is, the color of the object X under measurement is analyzed and measured based on a detection signal outputted from the colorimetry sensor 420.

The light source section 410 includes alight source 411 and a plurality of lenses 412 (FIG. 11 shows only one of them) and outputs, for example, reference light (white light, for example) toward the object X under measurement. The plurality of lenses 412 may include a collimator lens. In this case, in the light source section 410, the collimator lens parallelizes the reference light emitted from the light source 411 and outputs the parallelized reference light through a projection lens (not shown) toward the object X under measurement. In the present embodiment, the colorimetry apparatus 400 including the light source section 410 is presented by way of example, but the light source section 410 may not be provided, for example, when the object X under measurement is a liquid crystal panel or any other light emitting member.

The colorimetry sensor 420 includes the wavelength tunable interference filter 5, the detector 11, which receives light having passed through the wavelength tunable interference filter 5, and the voltage controller 15, which controls the voltage applied to the electrostatic actuator 56 in the wavelength tunable interference filter 5, as shown in FIG. 11. The colorimetry sensor 420 further includes an optical lens for incident light (not shown) that is located a position facing the wavelength tunable interference filter 5 and guides the reflected light reflected off the object X under measurement (light under measurement) into the colorimetry sensor 420. In the colorimetry sensor 420, the wavelength tunable interference filter 5 separates light of a predetermined wavelength from the light under measurement incident through the optical lens for incident light and the detector 11 receives the separated light.

The control section 430 is the control unit in an embodiment of the invention and controls overall action of the colorimetry apparatus 400.

The control section 430 can, for example, be a general-purpose personal computer, a personal digital assistant, or a computer dedicated for colorimetry. The control section 430 includes a light source controller 431, a colorimetry sensor controller 432, and a colorimetry processor 433, as shown in FIG. 11.

The light source controller 431 is connected to the light source section 410 and outputs a predetermined control signal based, for example, on a user's setting input to the light source section 410 to cause it to emit white light of predetermined luminance.

The colorimetry sensor controller 432 is connected to the colorimetry sensor 420 and sets the wavelength of light to be received by the colorimetry sensor 420 based, for example, on a user's setting input and outputs an instruction signal to the colorimetry sensor 420 to cause it to detect the amount of light of the thus set wavelength. The voltage controller 15 in the colorimetry sensor 420 then applies a voltage to the electrostatic actuator 56 based on the control signal to drive the wavelength tunable interference filter 5.

The colorimetry processor 433 analyzes the chromaticity of the object X under measurement based on the received amount of light detected with the detector 11. The colorimetry processor 433 may instead analyze the chromaticity of the object X under measurement by using the amount of light obtained from the detector 11 as a measured spectrum D and estimating an optical spectrum S by using an estimated matrix Ms, as in the first and second embodiments described above.

Another example of the electronic apparatus according to the embodiment of the invention may be a light-based system for detecting presence of a specific substance. Examples of such a system may include an on-vehicle gas leakage detector that employs a spectroscopic measurement method using the wavelength tunable interference filter 5 according to any of the embodiments of the invention, an optoacoustic rare gas detector for respiratory detection, and other gas detection apparatus.

An example of such a gas detection apparatus will be described below with reference to the drawings.

Figure 12:
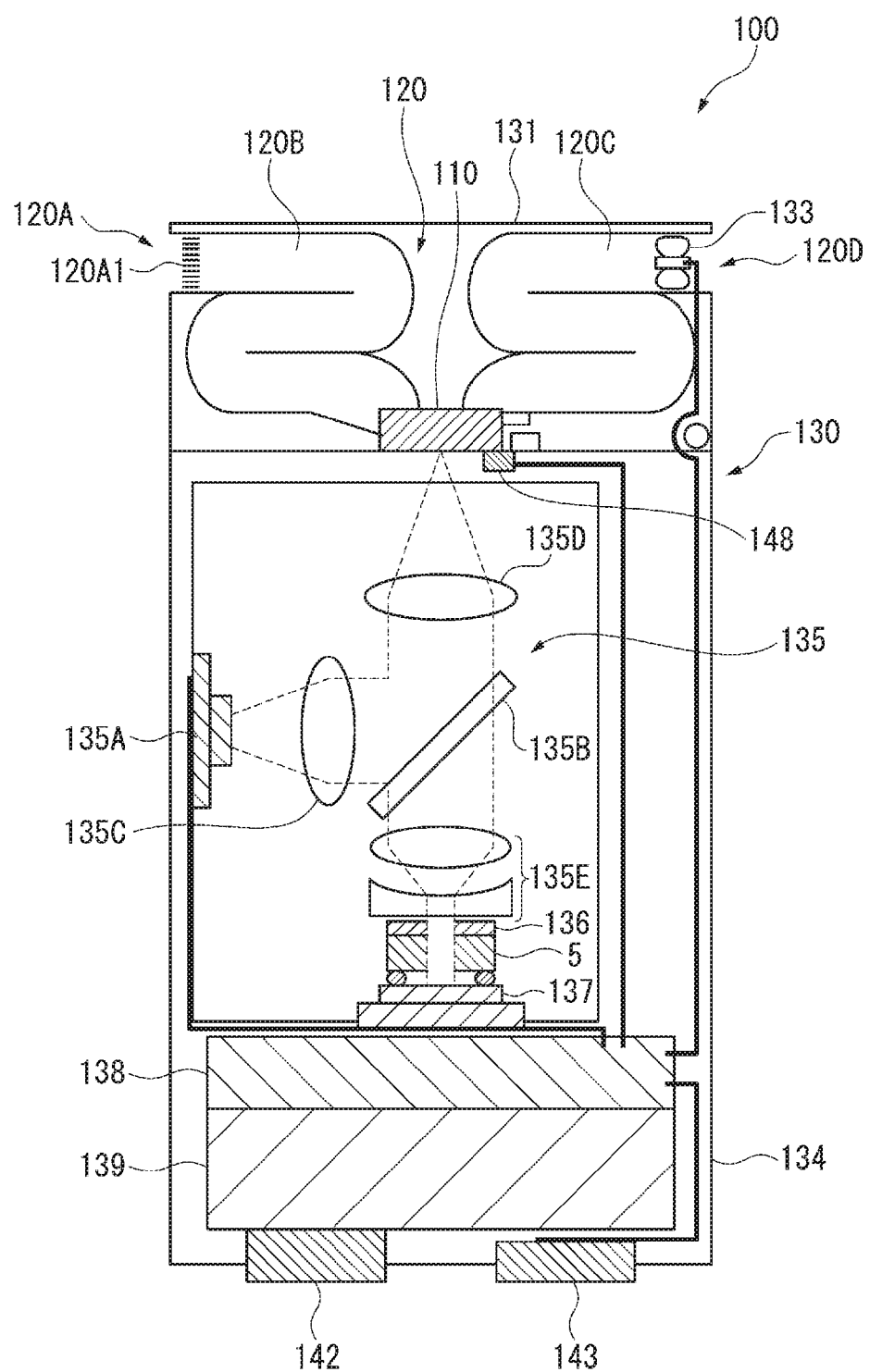
FIG. 12 shows a schematic configuration of a gas detection apparatus (electronic apparatus) including any of the wavelength tunable interference filters according to the embodiments of the invention.

FIG. 12 is a schematic view showing an example of a gas detection apparatus including the wavelength tunable interference filter 5.

Figure 13:
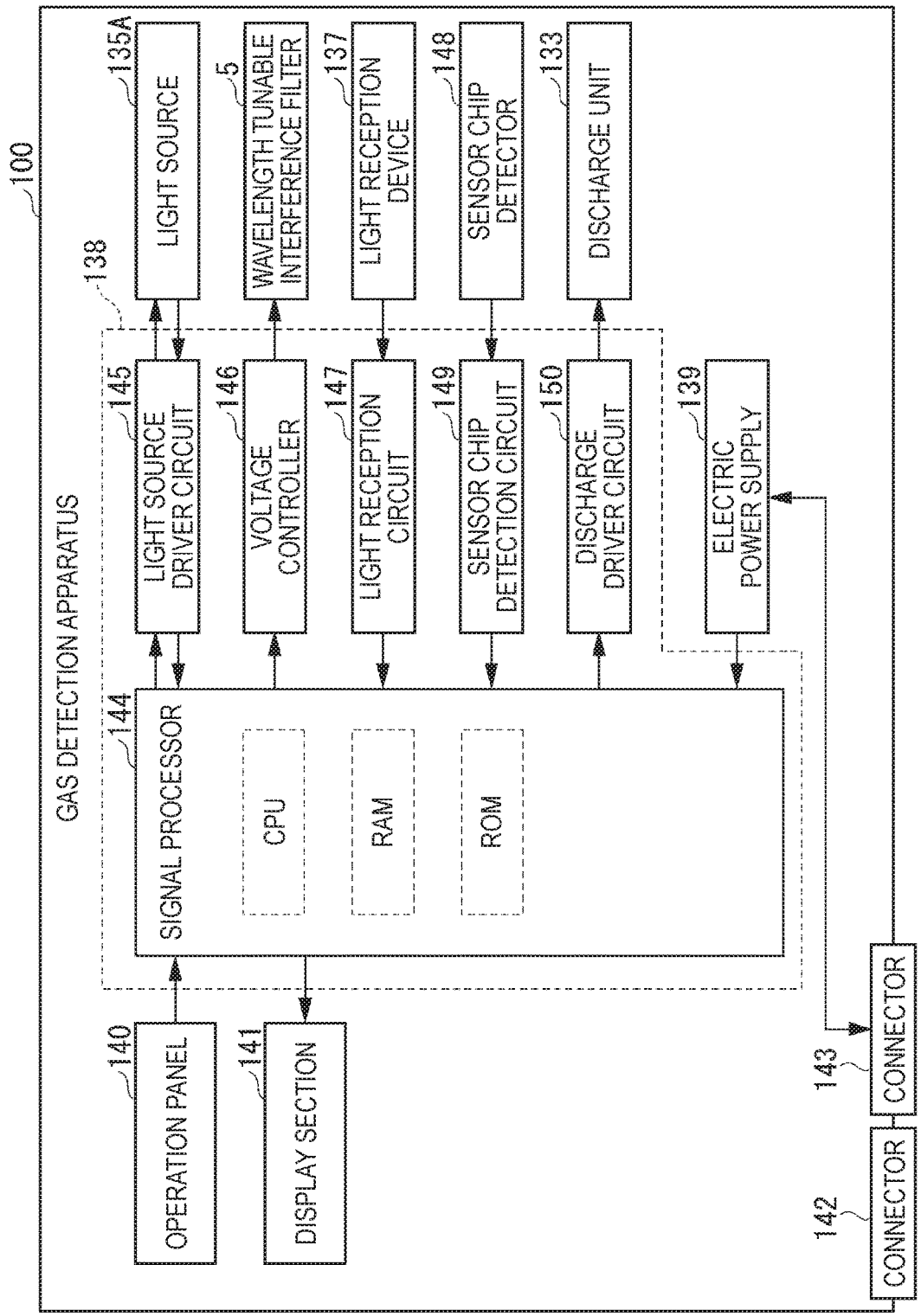
FIG. 13 is a block diagram showing a control system of the gas detection apparatus shown in FIG. 12.

FIG. 13 is a block diagram showing the configuration of a control system of the gas detection apparatus shown in FIG. 12.

A gas detection apparatus 100 includes a sensor chip 110, a channel 120 having a suction port 120A, a suction channel 120B, a discharge channel 120C, and a discharge port 120D, and a main body 130, as shown in FIG. 12.

The main body 130 includes a sensor unit cover 131 having an aperture through which the channel 120 can be attached and detached, a discharge unit 133, an enclosure 134, an optical unit 135, a filter 136, the wavelength tunable interference filter 5, a detection unit including a light reception device 137 (detector), a control unit 138, which processes a detected signal and controls the detector, and an electric power supply 139, which supplies electric power. The optical unit 135 includes a light source 135A, which emits light, a beam splitter 135B, which reflects the light incident from the light source 135A toward the sensor chip 110 whereas transmitting light incident from the sensor chip side toward the light reception device 137, and lenses 135C, 135D, and 135E.

On the exterior surface of the gas detection apparatus 100 are provided an operation panel 140, a display section 141, a connector 142 for external interfacing, and the electric power supply 139, as shown in FIG. 13. When the electric power supply 139 is a secondary battery, a connector 143 for charging purposes may be further provided.

Further, the control unit 138 in the gas detection apparatus 100 includes a signal processor 144, which is formed, for example, of a CPU, alight source driver circuit 145, which controls the light source 135A, a voltage controller 146, which controls the wavelength tunable interference filter 5, alight reception circuit 147, which receives a signal from the light reception device 137, a sensor chip detection circuit 149, which receives a signal from a sensor chip detector 148, which reads a code of the sensor chip 110 and detects whether or not the sensor chip 110 is present, and a discharge driver circuit 150, which controls the discharge unit 133, as shown in FIG. 13. The gas detection apparatus 100 further includes a storage section (not shown) that stores the V-λ data.

The action of the thus configured gas detection apparatus 100 will next be described.

The sensor chip detector 148 is disposed inside the sensor unit cover 131 in an upper portion of the main body 130, and the sensor chip detector 148 detects whether or not the sensor chip 110 is present. The signal processor 144, when it detects a detection signal from the sensor chip detector 148, determines that the sensor chip 110 has been attached and provides the display section 141 with a display signal that causes the display section 141 to display information representing that detection action is ready.

For example, when a user operates the operation panel 140 and the operation panel 140 outputs an instruction signal representing start of detection to the signal processor 144, the signal processor 144 first outputs a light source activation signal to the light source driver circuit 145 to activate the light source 135A. Having been driven, the light source 135A emits single-wavelength, linearly polarized, stable laser light. Further, the light source 135A has a built-in temperature sensor and light amount sensor, which output information on the temperature and the amount of light to the signal processor 144. When the signal processor 144 determines that the light source 135A is operating in a stable manner based on the temperature and the amount of light inputted from the light source 135A, the signal processor 144 controls the discharge driver circuit 150 to activate the discharge unit 133. As a result, a gaseous specimen containing a target substance to be detected (gas molecule) is guided through the suction port 120A through the suction channel 120B, the sensor chip 110, and the discharge channel 120C to the discharge port 120D. The suction port 120A is provided with a dust removal filter 120A1, which removes relatively large dust, part of water vapor, and other substances.

The sensor chip 110 is a sensor that has a plurality of metal nano-structures incorporated therein and operates based on localized surface plasmon resonance. In the thus configured sensor chip 110, the laser light incident thereon forms an enhanced electric field among the metal nano-structures. When a gas molecule enters the enhanced electric field, Raman scattered light carrying information on molecular vibration and Rayleigh scattered light are produced.

The Rayleigh scattered light and the Raman scattered light are incident through the optical unit 135 on the filter 136, which separates the Rayleigh scattered light out, and the Raman scattered light is incident on the wavelength tunable interference filter 5. The signal processor 144 then outputs a control signal to the voltage controller 146. The voltage controller 146 then reads a voltage value corresponding to a wavelength under measurement from the storage section and applies the voltage to the electrostatic actuator 56 in the wavelength tunable interference filter 5 to cause the wavelength tunable interference filter 5 to separate Raman scattered light corresponding to the gas molecule under detection, as described in the above first embodiment. Thereafter, having received the separated light, the light reception device 137 outputs a light reception signal according to the amount of received light to the signal processor 144 via the light reception circuit 147. In this case, target Raman scattered light can be precisely extracted through the wavelength tunable interference filter 5.

The signal processor 144 compares data on the spectrum of the thus obtained Raman scattered light corresponding to the gas molecule under detection with data stored in a ROM and determines whether or not the detected gas molecule is the target gas molecule to identify the substance. The signal processor 144 further displays information on the result of the identification on the display section 141 and outputs the information via the connector 142 to an external apparatus.

In FIGS. 12 and 13 described above, the gas detection apparatus 100, which performs gas detection based on Raman scattered light separated from initial Raman scattered light by the wavelength tunable interference filter 5, is presented by way of example, but a gas detection apparatus that identifies the type of gas by detecting the absorbance specific to the gas may instead be used. In this case, a gas sensor that receives a gas flowing therein, separates light absorbed by the gas from incident light, and detects the separated light is used as the optical module according to the embodiment of the invention. A gas detection apparatus that includes the gas sensor and analyzes and identifies a gas that flows into the gas sensor can be the electronic apparatus according to the embodiment of the invention. The configuration described above also allows gas component detection by using the wavelength tunable interference filter 5.

The system for detecting presence of a specific substance is not limited to the gas detection system described above. Another system for detecting presence of a specific substance can, for example, be a substance composition analyzer, such as a noninvasive measurement apparatus for measuring sugars based on near-infrared spectroscopy and a noninvasive measurement apparatus for acquiring information on food, biological body, mineral, and other substances.

A food analyzer will be described below as an example of the substance composition analyzer described above.

Figure 14:
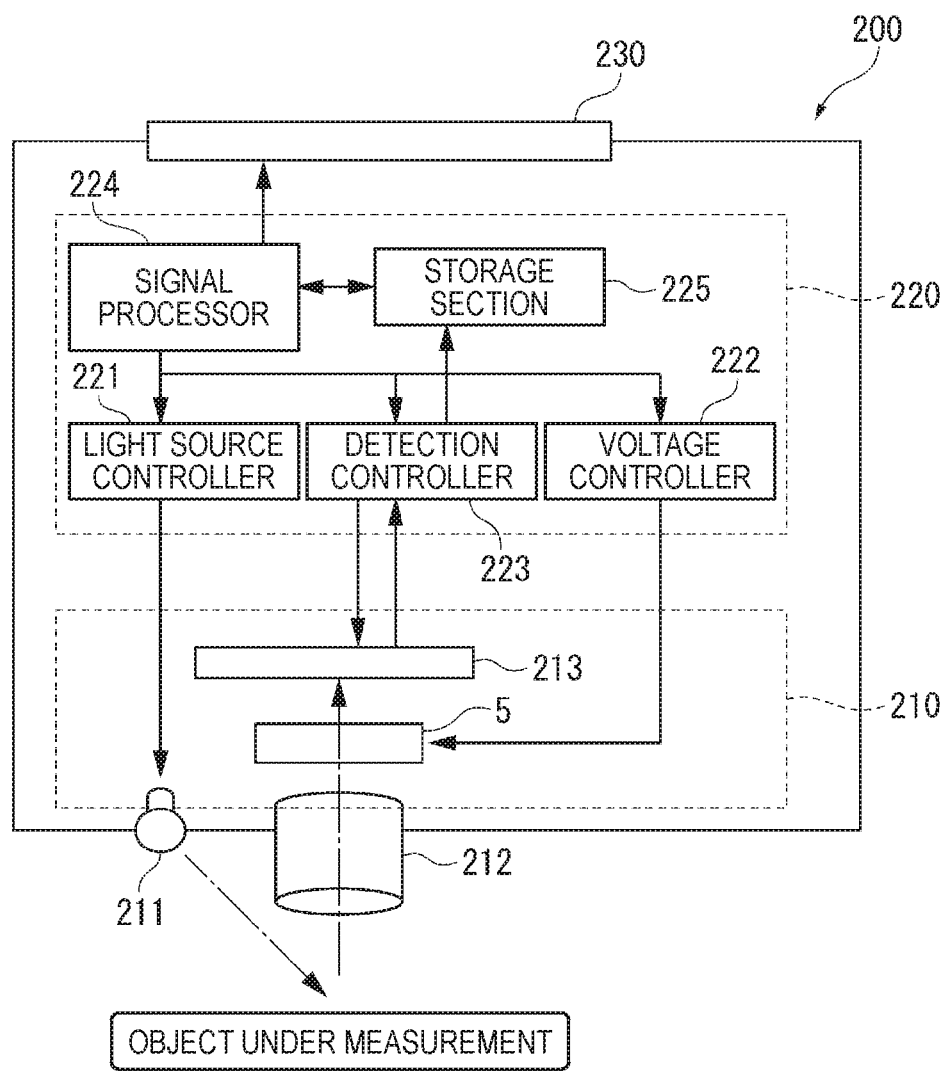
FIG. 14 shows a schematic configuration of a food analyzer (electronic apparatus) including any of the wavelength tunable interference filters according to the embodiments of the invention.

FIG. 14 shows a schematic configuration of a food analyzer that is an example of the electronic apparatus using the wavelength tunable interference filter 5.

A food analyzer 200 includes a detection unit 210 (optical module), a control unit 220, and a display unit 230, as shown in FIG. 14. The detection unit 210 includes a light source 211, which emits light, an imaging lens 212, which introduces light from an object under measurement, the wavelength tunable interference filter 5, which separates desired light from the light introduced through the imaging lens 212, and an imager 213 (detector), which detects the separated light.

The control unit 220 includes a light source controller 221, which performs light-on/off control on the light source 211 and luminance control when the light source 211 is emitting light, a voltage controller 222, which controls the wavelength tunable interference filter 5, a detection controller 223, which controls the imager 213 and acquires a spectroscopic image captured with the imager 213, a signal processor 224, and a storage section 225.

In the food analyzer 200, when the system thereof is driven, the light source controller 221 controls the light source 211 to cause it to emit light toward an object under measurement. Light reflected off the object under measurement then passes through the imaging lens 212 and enters the wavelength tunable interference filter 5. The wavelength tunable interference filter 5 is driven under the control of the voltage controller 222 based on the drive method shown in the first or second embodiment described above. The wavelength tunable interference filter 5 can thus precisely extracts light of a target wavelength. The extracted light is then captured as an image with the imager 213 formed, for example, of a CCD camera. The captured image light is accumulated as a spectroscopic image in the storage section 225. The signal processor 224 controls the voltage controller 222 to change the value of the voltage applied to the wavelength tunable interference filter 5 to acquire spectroscopic images of a variety of wavelengths.

The signal processor 224 then computes data from the pixels of each of the images accumulated in the storage section 225 to determine a spectrum at each of the pixels. The storage section 225 has further stored, for example, information on the composition of food corresponding to a spectrum, and the signal processor 224 analyzes data on the obtained spectra based on the information on food stored in the storage section 225 to determine food components contained in the object under detection and the contents of the food components. Further, the calorie, the degree of freshness, and other factors of the food can be calculated based on the resultant food components and contents thereof. Moreover, the spectral distribution in each image can be analyzed, for example, to extract a portion of the food under inspection where freshness has lowered and even detect foreign matter and other undesirable objects contained in the food.

The signal processor 224 then displays information on the thus obtained components, contents, calorie, freshness, and other factors of the food under inspection on the display unit 230.

In addition to the example of the food analyzer 200 shown FIG. 14, substantially the same configuration can be used as noninvasive measurement apparatus described above that measure other types of information. For example, a bioanalyzer that analyzes biological components, for example, measures and analyzes blood or other bodily fluid components, can be provided. A bioanalyzer of this type, for example, an apparatus that measures blood and other bodily fluid components, can be an apparatus that senses ethyl alcohol, which can be used as a drunk-driving prevention apparatus that detects the state of a drunk driver. Further, an electronic endoscope system including a bioanalyzer of this type can be provided.

Moreover, a mineral analyzer that analyzes mineral components can be provided.

Further, the wavelength tunable interference filter, the optical module, and the electronic apparatus according to the embodiments of the invention are applicable to the following apparatus.

For example, changing the intensity of light of a variety of wavelengths overtime allows the light of the variety of wavelengths to transmit data. In this case, the wavelength tunable interference filter 5 provided in an optical module separates light of a specific wavelength and a light receiver receives the light for extraction of the data transmitted by the light of the specific wavelength. An electronic apparatus including the data extraction optical module can process the data carried by the light of the variety of wavelengths for optical communication.

Further, an electronic apparatus including the wavelength tunable interference filter according to any of the embodiments of the invention that separates light is applicable to a spectroscopic camera that captures a spectroscopic image, a spectroscopic analyzer, and other apparatus. An example of a spectroscopic camera of this type may include an infrared camera in which the wavelength tunable interference filter 5 is incorporated.

Figure 15:
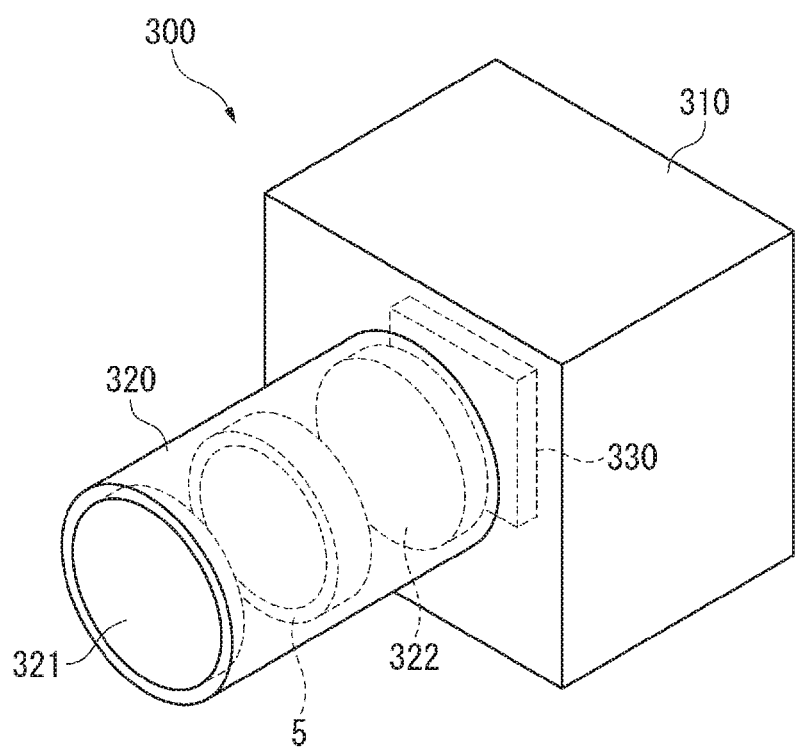
FIG. 15 shows a schematic configuration of a spectroscopic camera (electronic apparatus) including any of the wavelength tunable interference filters according to the embodiments of the invention.

FIG. 15 is a diagrammatic view showing a schematic configuration of a spectroscopic camera. A spectroscopic camera 300 includes a camera body 310, an imaging lens unit 320, and an imager 330 (detector), as shown in FIG. 15.

The camera body 310 is a portion grasped and operated by a user.

The imaging lens unit 320 is attached to the camera body 310 and guides incident image light to the imager 330. The imaging lens unit 320 includes an objective lens 321, an image forming lens 322, and the wavelength tunable interference filter 5 disposed between the two lenses, as shown in FIG. 15.

The imager 330 is formed of a light reception device and captures the image light guided through the imaging lens unit 320.

The thus configured spectroscopic camera 300, in which the wavelength tunable interference filter 5 transmits light of a wavelength to be captured as an image, can capture a spectroscopic image formed by the light of a desired wavelength.

Further, the wavelength tunable interference filter according to any of the embodiments of the invention may be used as a bandpass filter. For example, the wavelength tunable interference filter can be used as an optical laser apparatus in which the wavelength tunable interference filter 5 receives light within a predetermined wavelength region emitted from a light emitting device, separates only narrow-band light around a predetermined wavelength, and transmits the separated light.

Moreover, the wavelength tunable interference filter according to any of the embodiments of the invention may be used as a biometrics authentication apparatus. For example, the wavelength tunable interference filter is also applicable to an authentication apparatus based on blood vessels, fingerprints, retina, iris, or any other body part by using near-infrared light or visible light.

Further, the optical module and the electronic apparatus according to the embodiments of the invention can be used as a concentration detection apparatus. In this case, the wavelength tunable interference filter 5 separates infrared energy (infrared light) radiated from an object, and the energy is analyzed for measurement of the concentration of a subject in a sample.

As described above, the wavelength tunable interference filter, the optical module, and the electronic apparatus according to the embodiments of the invention are applicable to any apparatus that separates predetermined light from incident light. Since the wavelength tunable interference filter according to any of the embodiments of the invention can by itself separate light of a plurality of wavelengths from incident light as described above, spectral measurement based on the plurality of wavelengths and detection of a plurality of components can be performed with precision. Therefore, each of the optical module and the electronic apparatus has a size further smaller than the size of an apparatus of related art that extracts light of a desired wavelength by using a plurality of devices and can, for example, be preferably used as a portable or on-vehicle optical device.

In addition, the specific structure according to an embodiment of the invention may be an appropriate combination of the embodiments and the variations described above or may be changed as appropriate to any other structure in actual implementation of the invention to the extent that the advantage of the invention is achieved.

What is claimed is:

1. An interference filter comprising:
a first substrate;
a second substrate that is opposing to the first substrate;
a first reflector that is disposed directly on the first substrate, and between the first substrate and the second substrate;
a second reflector that is disposed between the first reflector and the second substrate;
a first light absorbing layer that is disposed between the first substrate and the second substrate;
a first metal actuator electrode that overlaps the first light absorbing layer, the first light absorbing layer being disposed between the first substrate and the first metal actuator electrode; and
a second metal actuator electrode that is disposed between the first metal actuator electrode and the second substrate,
wherein the first light absorbing layer is disposed so as to contact the first metal actuator electrode,
each of the first metal actuator electrode and the first light absorbing layer are sandwiched between the first substrate and the first reflector, and
an edge of the light absorbing layer is flush with an edge of the first metal actuator electrode.

2. The interference filter according to claim 1,
the first reflector overlaps the first metal actuator electrode and the first light absorbing layer.

3. The interference filter according to claim 1, further comprising:
a second light absorbing layer that is disposed between the second metal actuator electrode and the second substrate.

4. The interference filter according to claim 1, further comprising:
a third light absorbing layer that is opposed to the first light absorbing layer,
wherein the first light absorbing layer and the third light absorbing layer sandwich the first substrate.

5. The interference filter according to claim 1,
wherein the first metal actuator electrode is electrically connected to the first reflector.

6. The interference filter according to claim 5,
wherein the second metal actuator electrode comprises a mirror electrode that is electrically connected to the second reflector.

7. An interference filter comprising:
a first substrate;
a first reflector that is disposed directly on the first substrate;
a second reflector that is disposed on the first reflector;
a first light absorbing layer that is disposed on the first substrate;
a first metal actuator electrode that overlaps the first light absorbing layer, the first light absorbing layer being disposed between the first substrate and the first metal actuator electrode; and
a second metal actuator electrode that is disposed on the first metal actuator electrode,
wherein the first light absorbing layer is disposed so as to contact the first metal actuator electrode,
each of the first metal actuator electrode and the first light absorbing layer are sandwiched between the first substrate and the first reflector, and
an edge of the light absorbing layer is flush with an edge of the first metal actuator electrode.

8. An optical filter device comprising:
the interference filter according to claim 1; and
an enclosure that accommodates the interference filter.

9. An optical module comprising:
the interference filter according to claim 1; and
a detector that detects light from the interference filter.

10. An electronic apparatus comprising:
the interference filter according to claim 1; and
a controller that controls the interference filter.

11. The interference filter according to claim 1, wherein the first reflector and the second reflector are separated by a gap, and the first metal actuator electrode and the second metal actuator electrode are configured for electrostatic attraction therebetween to adjust a size of the gap.

12. The interference filter according to claim 7, wherein the first reflector and the second reflector are separated by a gap, and the first metal actuator electrode and the second metal actuator electrode are configured for electrostatic attraction therebetween to adjust a size of the gap.

13. The interference filter according to claim 1, wherein a distance between an outer edge of the first reflector and the second reflector is less than a distance between a center of the first reflector and the second reflector.

14. The interference filter according to claim 7, wherein a distance between an outer edge of the first reflector and the second reflector is less than a distance between a center of the first reflector and the second reflector.

15. The interference filter according to claim 1, wherein the first reflector is disposed directly on and in direct contact with the first substrate.

16. An interference filter comprising:
a first substrate;
a second substrate that is opposing to the first substrate;
a first reflector that is disposed directly on the first substrate, and between the first substrate and the second substrate;
a second reflector that is disposed between the first reflector and the second substrate;
a first light absorbing layer that is disposed between the first substrate and the second substrate;
a first metal actuator electrode that overlaps the first light absorbing layer, the first light absorbing layer being disposed between the first substrate and the first metal actuator electrode; and
a second metal actuator electrode that is disposed between the first metal actuator electrode and the second substrate, wherein the first light absorbing layer is disposed so as to contact the first metal actuator electrode, each of the first metal actuator electrode and the first light absorbing layer are sandwiched between the first substrate and the first reflector, and the second metal actuator electrode comprises a mirror electrode that is electrically connected to the second reflector.

17. The interference filter according to claim 16, the first reflector overlaps the first metal actuator electrode and the first light absorbing layer.

18. The interference filter according to claim 16, further comprising:

a second light absorbing layer that is disposed between the second metal actuator electrode and the second substrate.

19. The interference filter according to claim 16, further comprising:

a third light absorbing layer that is opposed to the first light absorbing layer, wherein the first light absorbing layer and the third light absorbing layer sandwich the first substrate.

20. The interference filter according to claim 16, wherein the first metal actuator electrode is electrically connected to the first reflector.

* * * * *